(12) United States Patent
Sakurai et al.

(10) Patent No.: US 8,487,211 B2
(45) Date of Patent: Jul. 16, 2013

(54) METHOD AND APPARATUS FOR USING MULTIPLE LASER BEAMS TO WELD MEMBERS THAT ARE SEPARATED BY A GAP

(75) Inventors: Tutomu Sakurai, Nara (JP); Seiji Kumazawa, Osaka (JP); Hidenao Kataoka, Osaka (JP)

(73) Assignee: Panasonic Corporation, Osaka (JP)

( * ) Notice: Subject to any disclaimer, the term of this patent is extended or adjusted under 35 U.S.C. 154(b) by 387 days.

(21) Appl. No.: 12/908,305

(22) Filed: Oct. 20, 2010

(65) Prior Publication Data

US 2011/0095003 A1    Apr. 28, 2011

(30) Foreign Application Priority Data

Oct. 27, 2009  (JP) ................................. 2009-245992

(51) Int. Cl.
*B23K 26/20* (2006.01)
(52) U.S. Cl.
USPC ............. 219/121.64; 219/121.63; 219/121.76
(58) Field of Classification Search
USPC ............. 219/121.63, 121.64, 121.65, 121.66, 219/121.76
See application file for complete search history.

(56) References Cited

U.S. PATENT DOCUMENTS

| | | | | |
|---|---|---|---|---|
| 4,691,093 A | * | 9/1987 | Banas et al. | 219/121.63 |
| 4,857,697 A | * | 8/1989 | Melville | 219/121.63 |
| 5,841,097 A | * | 11/1998 | Esaka et al. | 219/121.63 |
| 6,087,619 A | * | 7/2000 | Berkmanns et al. | 219/121.63 |

FOREIGN PATENT DOCUMENTS

| | | | |
|---|---|---|---|
| DE | 19902909 A1 | * | 8/2000 |
| DE | 10113471 A1 | * | 10/2002 |
| DE | 10261422 A1 | * | 7/2004 |
| JP | 57-160582 A | * | 10/1982 |
| JP | 58-74293 A | * | 5/1983 |
| JP | 60-199585 A | * | 10/1985 |
| JP | 61-88989 A | * | 7/1986 |
| JP | 4-231190 A | * | 8/1992 |
| JP | 2000-317667 A | * | 11/2000 |
| JP | 2003-290952 A | * | 4/2002 |
| JP | 2003-340582 A | * | 12/2003 |
| JP | 2005-254328 | | 9/2005 |

OTHER PUBLICATIONS

Machine translation of Japan Patent document No. 2005-254,328, Jan. 2013.*
Machine translation of Japan Patent document No. 2003-290,952, Jan. 2013.*
Machine translation of Japan Patent document No. 2003-340,582, Jan. 2013.*

* cited by examiner

*Primary Examiner* — Geoffrey S Evans
(74) *Attorney, Agent, or Firm* — Hamre, Schumann, Mueller & Larson, P.C.

(57) ABSTRACT

A fusion welding method includes the steps of: generating a hybrid laser beam obtained by mixing a low-intensity laser beam with a first high-intensity laser beam and a second high-intensity laser beam; moving the hybrid laser beam along a gap between a first member and a second member; and melting the first member and the second member in the periphery of the gap with the hybrid laser beam, and filling the gap with the melt of the first member and the melt of the second member to weld the first member and the second member, wherein the first high-intensity laser beam is applied to the area of the first member to which the low-intensity laser beam is applied, and the second high-intensity laser beam is applied to the area of the second member to which the low-intensity laser beam is applied.

7 Claims, 25 Drawing Sheets

METHOD AND APPARATUS FOR USING MULTIPLE LASER BEAMS TO WELD MEMBERS THAT ARE SEPARATED BY A GAP

FIELD OF THE INVENTION

The present invention relates to a fusion welding method in which a gap in a part to be welded between a first member and a second member is filled with melt obtained by melting the part to weld the first member and the second member.

BACKGROUND OF THE INVENTION

Conventionally, various techniques for laser processing have been proposed. One of the techniques is a method of processing a workpiece using a hybrid laser beam obtained by mixing two laser beams (hereinafter referred to as a hybrid laser processing method) (for example, see Japanese Patent Laid-Open No. 2005-254328).

For example, as shown in FIG. 29, in the hybrid laser processing method, a hybrid laser beam 1 obtained by mixing a first laser beam 1a and a second laser beam 1b is applied to a workpiece 10. The first laser beam 1a is a pulse laser beam having a wavelength different from that of the second laser beam 1b. The second laser beam 1b is a CW (Continuous Wave) laser beam having a smaller application are on the workpiece 10 than the first laser beam 1a. The foci of the first laser beam 1a and the second laser beam 1b are adjusted so that the application portion of the second laser beam 1b is located in the application portion of the first laser beam 1a on the workpiece 10.

Further, in this hybrid laser processing method, a keyhole 13 is formed in the application portion of the second laser beam 1b, and the first laser beam 1a increases the growth rate and depth of the keyhole 13. Thus, even a metal material such as aluminum having high reflectivity can be welded with a sufficient penetration depth and width at high speed.

Specifically, in this hybrid laser processing method, first, only the second laser beam 1b is applied to the workpiece 10, and the application portion of the second laser beam 1b is heated by the second laser beam 1b to a temperature lower than a melting point. Then, both the first laser beam 1a and the second laser beam 1b are applied to the portion, which is heated by the first laser beam 1a and the second laser beam 1b to the melting point or higher. Then, only the second laser beam 1b is applied to the portion, which is gradually cooled by the second laser beam 1b.

At this time, the first laser beam 1a having high intensity provides a large penetration amount at one time, and the first laser beam 1a having low intensity provides a small penetration amount at one time. The small penetration amount at one time allows the penetration amount to be accurately controlled, thereby preventing spattering. If the melted portion is gradually cooled, air bubbles generated in the portion can be removed. Further, the portion solidifies after the air bubbles are removed, thereby preventing welding defects such as porosities.

However, the conventional hybrid laser processing method has disadvantages described below.

For example, the conventional hybrid laser processing method is assumed to be used to weld the aluminum can and the sealing plate of a lithium-ion battery. In this case, if there is a gap in a part to be welded between the aluminum can and the sealing plate, the second laser beam 1b may enter through the gap into the lithium-ion battery. If both the first laser beam 1a and the second laser beam 1b enter, the first laser beam 1a and the second laser beam 1b having entered are reflected therein to damage the interior.

The conventional hybrid laser processing method is a kind of fusion welding which can reduce spattering but cannot completely eliminate spattering. Thus, spatters may enter through the gap. If spatters enter, they may cause a short circuit and ignite the lithium-ion battery.

This is because the lithium-ion battery has a higher energy density than a nickel hydrogen battery, and three times or more charging density is obtained with the same capacitance. Further, the electrode material is made of a flammable substance. Thus, the lithium-ion battery has a higher energy density and contains a flammable substance, and can easily overheat and be ignited suddenly in a short circuit.

In particular, if a large lithium-ion battery (hereinafter referred to as an on-vehicle storage battery) to be mounted in a hybrid car or an electric vehicle is ignited, the on-vehicle storage battery burns, and further the car itself burns and causes a serious accident.

Thus, in the production of an on-vehicle storage battery, when the conventional hybrid laser processing method is used, the gap in the part to be welded needs to be eliminated by fastening the periphery of the aluminum can with a machine or the like. Further, the on-vehicle storage battery is required to have no welding defect so that a liquid does not leak even if the temperature changes or the shape changes repeatedly with internal pressure fluctuations.

However, unfortunately, in a lithium-ion battery, gaps are easily created in welded portions because of the following points (1) to (4). If a gap of several tens of μm is created, a through hole is formed or a welding defect occurs, and the lithium-ion battery is rejected in a leak test.

(1) Aluminum is a metal material softer than iron. Thus, an aluminum can is warped more significantly than an iron can and easily creates a large gap. Further, a lithium-ion battery with a large size exhibits noticeable variations in the warp or mating of a part to be welded. In particular, in an on-vehicle storage battery, one side is about 10 cm. A battery with such a size exhibits large variations in warp or mating, inevitably creating a gap in a part to be welded. To fill the gap in the part to be welded, a welding width of nearly 1 mm is required. However, in the conventional hybrid laser processing method, it is difficult to completely eliminate the gap.

(2) Aluminum is a metal material having higher reflectivity than iron. Thus, spattering occurs in an aluminum can more easily than in an iron can. Thus, in the conventional hybrid laser processing method, it is difficult to prevent spattering when welding the aluminum can and a sealing plate.

(3) Aluminum is a metal material having higher thermal conductivity than iron. Thus, heat is more easily lost to the periphery of a part to be welded in an aluminum can than in an iron can. Thus, the intensity of a second laser beam needs to be increased. However, the second laser beam with increased intensity easily penetrates the part to be welded. If the part to be welded is penetrated, the interior is damaged.

(4) Aluminum is a metal material having a lower melting point than iron. Further, when aluminum is melted, the absorbance of a laser beam significantly increases. Thus, when the melting point is reached, melting rapidly progresses, thereby making it difficult to control the penetration depth of the part to be welded. The molten aluminum has high surface tension and is easily rounded. Thus, with a slight gap in the part to be welded, the end surface of the part to be welded shrinks to be rounded, thereby further enlarging the gap. As a result, perforation occurs more in the aluminum can than in an iron can. Further, since aluminum is easily oxidized, aluminum having melted and oxidized cannot be welded.

In addition to these disadvantages, in general welding, fusion welding is used when there is no gap in a part to be welded. Meanwhile, when there is a gap in the part to be welded, brazing and soldering are used. However, although spattering does not occur, the cost of brazing and soldering is high. Further, unfortunately, there is no aluminum brazing filler metal that satisfies a useful life of 15 years of an on-vehicle storage battery.

DISCLOSURE OF THE INVENTION

In view of the above-described disadvantages, the present invention has an object to provide a fusion welding method that eliminates the entrance of spatters and welding defects such as cracks or porosities even with a gap in a part to be welded, and also has a low thermal effect on the periphery and performs fusion welding at high speed.

To achieve the above-described object, a fusion welding method according to the present invention has the following features:

(1) A fusion welding method according to the present invention is (a) a fusion welding method for butt-welding a first member and a second member, comprising the steps of: (b) generating a hybrid laser beam obtained by mixing a low-intensity laser beam with a first high-intensity laser beam and a second high-intensity laser beam; (c) moving the hybrid laser beam along a gap between the first member and the second member; and (d) melting the first member and the second member in a periphery of the gap with the hybrid laser beam, and filling the gap with melt of the first member and melt of the second member to weld the first member and the second member, wherein (e) the first high-intensity laser beam and the second high-intensity laser beam each have a smaller application area and a higher intensity peak than the low-intensity laser beam, (f) the low-intensity laser beam is applied to the gap and the periphery of the gap, (g) the first high-intensity laser beam is applied to an area of the first member to which the low-intensity laser beam is applied, and (h) the second high-intensity laser beam is applied to an area of the second member to which the low-intensity laser beam is applied.

(2) A fusion welding method according to the present invention is (a) a fusion welding method for lap-welding a first member and a second member, in a case where the first member is a horizontally extending thin plate, the second member is vertically extending foil, and the first member is located vertically above the second member, the fusion welding method comprising the steps of: (b) generating a hybrid laser beam obtained by mixing a low-intensity laser beam with a first high-intensity laser beam and a second high-intensity laser beam; (c) moving the hybrid laser beam on an upper surface of the first member; (d) melting the first member with the hybrid laser beam, and filling a gap between the first member and the second member with a lower portion of melt of the first member to weld the first member and an end of the second member, wherein (e) the first high-intensity laser beam and the second high-intensity laser beam each have a smaller application area and a higher intensity peak than the low-intensity laser beam, (f) the low-intensity laser beam is applied to the upper surface of the first member, (g) the first high-intensity laser beam and the second high-intensity laser beam are applied to an outer periphery in an area to which the low-intensity laser beam is applied, (h) an optical axis of the low-intensity laser beam is arranged between the first high-intensity laser beam and the second high-intensity laser beam, (i) a sectional shape of the melt of the first member becomes substantially rectangular or trapezoidal when viewed from a traveling direction of the hybrid laser beam, (j) a lower surface of the first member is brought into contact with the end of the second member.

The present invention may be achieved not only as a fusion welding method and but also as a fusion welding apparatus described below.

(3) A fusion welding apparatus according to the present invention includes: (a) a low-intensity laser beam output unit for outputting a low-intensity laser beam; (b) a first high-intensity laser beam output unit for outputting a first high-intensity laser beam having a smaller application area and a higher intensity peak than the low-intensity laser beam; (c) a second high-intensity laser beam output unit for outputting a second high-intensity laser beam having a smaller application area and a higher intensity peak than the low-intensity laser beam; (d) an optical system for mixing the first high-intensity laser beam and the second high-intensity laser beam on the low-intensity laser beam to generate a hybrid laser beam; and (e) a blow-off unit for blowing off an inactive gas from the front and the rear in the traveling direction of the hybrid laser beam toward a portion to which the hybrid laser beam is applied, wherein (f) the intensity of the low-intensity laser beam is set so that a keyhole is not formed in a portion to which only the low-intensity laser beam is applied, (g) the intensity of the first high-intensity laser beam is set so that a keyhole is formed in a portion to which the first high-intensity laser beam and the low-intensity laser beam are applied together, (h) the intensity of the second high-intensity laser beam is set so that a keyhole is formed in a portion to which the second high-intensity laser beam and the low-intensity laser beam are applied together, and (i) the foci of the low-intensity laser beam, the first high-intensity laser beam, and the second high-intensity laser beam are set so that the first high-intensity laser beam and the second high-intensity laser beam are distributed to the outer periphery of the low-intensity laser beam with the optical axis of the low-intensity laser beam held between the first high-intensity laser beam and the second high-intensity laser beam.

As described above, according to the present invention, when the hybrid laser beam is used to fill the gap in the part to be welded with molten metal from both sides thereof, the first member and the second member can be welded by, for example, brazing even if there is a gap in the part to be welded between the butted first member and second member. Further, keyholes are formed in the first member and the second member with a predetermined penetration width, thereby completely preventing spatters from entering through the gap.

According to the present invention, when the hybrid laser beam is used to fill the gap in the part to be welded in the lower portion of a molten pool formed in the first member, the first member and the second member can be welded by, for example, brazing even if there is a gap in the part to be welded between the lapped first member and second member. Further, the first member and the second member are welded in the lower portion of the molten pool formed in the first member, thereby completely preventing the entrance of spatters.

Further, the low-intensity laser beam gradually cools a welded part, thereby completely preventing welding defects such as cracks or porosities. Meanwhile, the first high-intensity laser beam and the second high-intensity laser beam melt the application portion instantaneously, thereby reducing thermal effects on the periphery to allow for fusion welding at high speed.

The present invention may be used as a fusion welding method for filling a gap in a part to be welded between a first member and a second member with melt obtained by melting the part to be welded to weld the first member and the second member.

DESCRIPTION OF THE EMBODIMENTS (First Embodiment)

Now, a first embodiment according to the present invention will be described.

<Outline>

Figure 1:
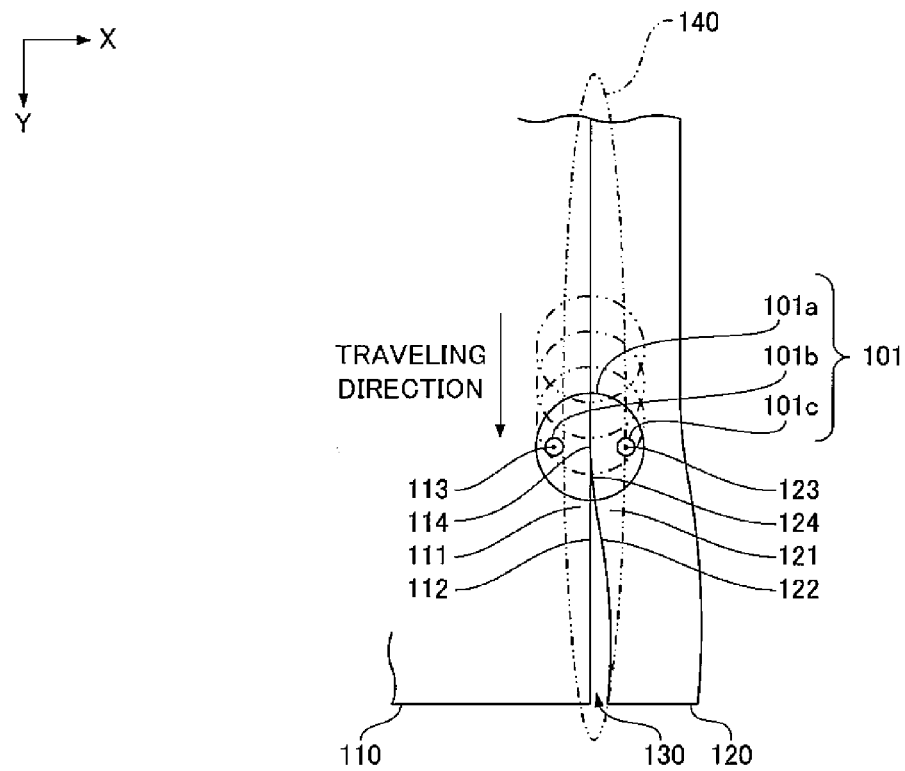
FIG. 1 shows the outline of a fusion welding method in a first embodiment.
Figure 2:
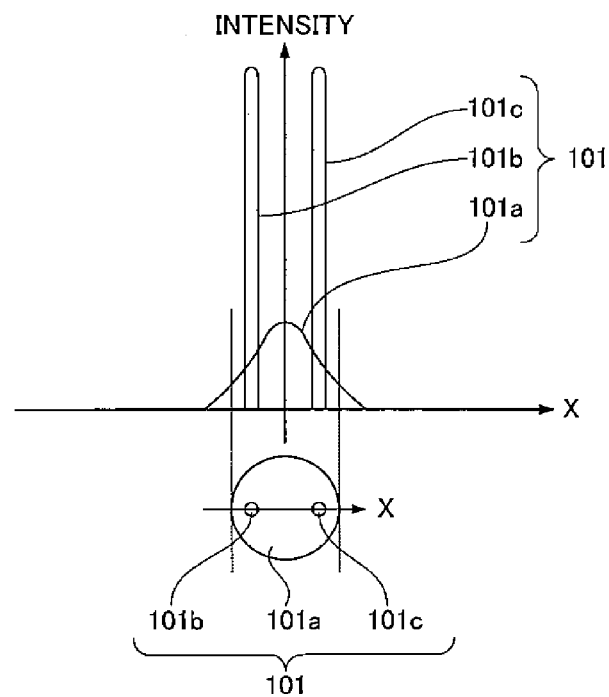
FIG. 2 shows the characteristics of a hybrid laser beam used in the fusion welding method in the first embodiment.

First, in a fusion welding method of this embodiment, as shown in FIG. 1, a hybrid laser beam 101 of FIG. 2 is used to butt-join a first member 110 and a second member 120. At this time, the hybrid laser beam 101 is applied to a gap 130 between the first member 110 and the second member 120 and to a periphery 140 of the gap while being moved along the gap 130 between the first member 110 and the second member 120 to fill the gap 130 with molten metal from both sides of the gap.

In the drawings, X and Y directions are horizontal and Z direction is vertical.

<Hybrid Laser Beam 101>

The hybrid laser beam 101 is obtained by mixing, on a low-intensity laser beam 101a, a first high-intensity laser beam 101b and a second high-intensity laser beam 101c. The low-intensity laser beam 101a has intensity distribution such as Gaussian distribution. The first high-intensity laser beam 101b and the second high-intensity laser beam 101c are distributed to the outer periphery of the low-intensity laser beam 101a with the optical axis of the low-intensity laser beam 101a held between the first high-intensity laser beam 101b and the second high-intensity laser beam 101c.

Further, the first high-intensity laser beam 101b and the second high-intensity laser beam 101c each have a smaller application area and a higher intensity peak than the low-intensity laser beam 101a. The intensity of the low-intensity laser beam 101a is set so that a keyhole is not formed in the application portion. The intensities of the first high-intensity laser beam 101b and the second high-intensity laser beam 101c are set so that a keyhole is formed in the application portion with the first high-intensity laser beam 101b and the second high-intensity laser beam 101c mixed on the low-intensity laser beam 101a.

As an example, the low-intensity laser beam 101a is herein set so that the focus is located in the gap 130 between the first member 110 and the second member 120. With the optical axes being arranged in the X direction, the low-intensity laser beam 101a, the first high-intensity laser beam 101b, and the second high-intensity laser beam 101c travel along the Y direction. The first high-intensity laser beam 101b and the second high-intensity laser beam 101c have the same intensity peak.

<Low-Intensity Laser Beam 101a>

The low-intensity laser beam 101a is applied to the gap 130 between the first member 110 and the second member 120. In the periphery 140 of the gap, the application portion of the low-intensity laser beam 101a is gradually heated by the low-intensity laser beam 101a. The surface of the application portion of the low-intensity laser beam 101a starts melting.

<First High-Intensity Laser Beam 101b>

The first high-intensity laser beam 101b is applied to an end 111 (hereinafter referred to as a first part to be welded 111) of the first member 110 in the periphery 140 of the gap. In the first member 110, the application portion of the first high-intensity laser beam 101b is instantaneously heated to the melting point or more of the first member 110 by the first high-intensity laser beam 101b and the low-intensity laser beam 101a. A keyhole 113 (hereinafter referred to as a first keyhole 113) is formed in the application portion of the first high-intensity laser beam 101b. Heat is supplied to an end surface 112 (hereinafter referred to as a first surface to be welded 112) facing the gap 130 of the first member 110 via the first keyhole 113. The heat supplied to the first surface to be welded 112 melts the vicinity of the first surface to be welded 112. Molten metal 114 (hereinafter referred to as first molten metal 114) around the first surface to be welded 112 starts flowing down by gravity and is held on the first surface to be welded 112 by surface tension.

<Second High-Intensity Laser Beam 101c>

The second high-intensity laser beam 101c is applied to an end 121 (hereinafter referred to as a second part to be welded 121) of the second member 120 in the periphery 140 of the gap. In the second member 120, the application portion of the second high-intensity laser beam 101c is instantaneously heated to the melting point or more of the second member 120 by the second high-intensity laser beam 101c and the low-intensity laser beam 101a. A keyhole 123 (hereinafter referred to as a second keyhole 123) is formed in the application portion of the second high-intensity laser beam 101c. Heat is supplied to an end surface 122 (hereinafter referred to as a second surface to be welded 122) facing the gap 130 of the second member 120 via the second keyhole 123. The heat supplied to the second surface to be welded 122 melts the vicinity of the second surface to be welded 122. Molten metal 124 (hereinafter referred to as second molten metal 124) around the second surface to be welded 122 starts flowing down by gravity and is held on the second surface to be welded 122 by surface tension.

The first molten metal 114 held on the first surface to be welded 112 by surface tension is brought into contact with the second molten metal 124 held on the second surface to be welded 122 by surface tension. The first molten metal 114 and the second molten metal 124 function as a brazing filler metal and instantaneously fill the gap 130 between the first member 110 and the second member 120.

<Variations in Size of Gap 130>

Figure 3:
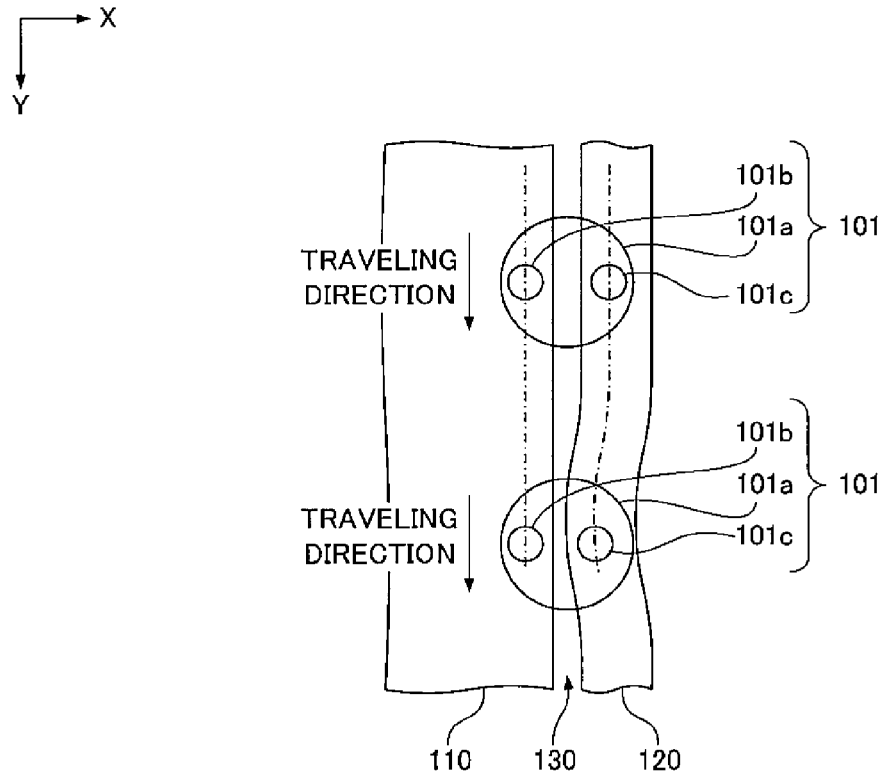
FIG. 3 shows a case where a gap varies in size in the fusion welding method in the first embodiment.

As shown in FIG. 3, there is the gap 130 along the Y direction between the first member 110 and the second member 120. The gap 130 is assumed to vary in size in the X direction. In this case, the size in the X direction of the gap 130 is manually or automatically measured along the Y direction. During the application of the hybrid laser beam 101, the application position of the first high-intensity laser beam 101b and the application position of the second high-intensity laser beam 101c are adjusted depending on the size in the X direction of the gap 130 at each point.

Specifically, the application position of the first high-intensity laser beam 101b is adjusted such that a distance (penetration width) is held constant between the formation position of the first keyhole 113 and the welding surface 112 of the first member 110. Similarly, the application position of the second high-intensity laser beam 101c is adjusted such that a distance (penetration width) is held constant between the formation position of the second keyhole 123 and the second surface to be welded 122.

Thus, in spite of variations in the size in the X direction of the gap 130, a constant penetration width can be maintained. As shown in FIG. 1, the first molten metal 114 held on the first surface to be welded 112 by surface tension and the second molten metal 124 held on the second surface to be welded 122 by surface tension can fill the gap 130 between the first member 110 and the second member 120.

The penetration width may be adjusted so as to obtain the first molten metal 114 and the second molten metal 124 in appropriate amounts for filling the gap 130.

<Foreign Matter>

Figure 4:
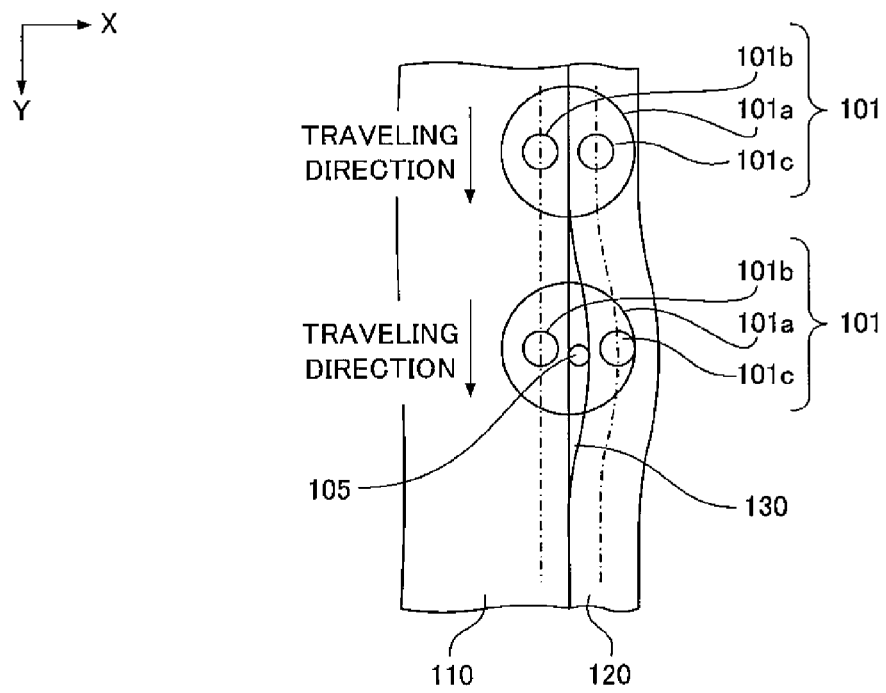
FIG. 4 shows a case where a foreign matter is held in the gap in the fusion welding method in the first embodiment.

As shown in FIG. 4, one of the reasons for variations in the size in the X direction of the gap 130 is that a foreign matter 105 is held between the first member 110 and the second member 120. In such a case, spatters are often held between the first member 110 and the second member 120 in an actual production process.

For example, in the conventional hybrid laser processing method, a gap in a part to be welded causes defects such as perforations and leaks. The occurrence rate of perforations and leaks is about 1%. Perforations and leaks are the main factors of defects and cause a large loss.

<Adjustment Depending on Width of Gap>

As described in (a) and (b) below, the intensities of the first high-intensity laser beam 101b and the second high-intensity laser beam 101c may be increased or decreased or the intensity of the low-intensity laser beam 101a may be increased or decreased depending on a change in the width (size in the X direction) of the gap 130. Thus, the amounts of the first molten metal 114 and the second molten metal 124 generated in the periphery 140 of the gap can be adjusted to fill the gap 130.

(a) The width (size in the X direction) of the gap 130 is manually or automatically measured along the extending direction (Y direction) of the gap 130. During the application of the hybrid laser beam 101, the intensity of the low-intensity laser beam 101a is adjusted within a range where a keyhole is not formed in the periphery 140 of the gap depending on a change in the width (size in the X direction) of the gap 130.

Specifically, (a1) when the width (size in the X direction) of the gap 130 increases, the intensity of the low-intensity laser beam 101a is increased so as to increase the amounts of the first molten metal 114 and the second molten metal 124 around the welding surfaces of the first member 110 and the second member 120. (a2) When the width (size in the X direction) of the gap 130 decreases, the intensity of the low-intensity laser beam 101a is reduced so as to reduce the amounts of the first molten metal 114 and the second molten metal 124 around the welding surfaces of the first member 110 and the second member 120.

(b) The width (size in the X direction) of the gap 130 is manually or automatically measured along the extending direction (Y direction) of the gap 130. During the application of the hybrid laser beam 101, the intensity of the first high-intensity laser beam 101b is adjusted within a range where the first member 110 is not penetrated depending on a change in the width (size in the X direction) of the gap 130. Further, the intensity of the second high-intensity laser beam 101c is adjusted within a range where the second member 120 is not penetrated.

Specifically, (b1) when the width (size in the X direction) of the gap 130 is increased, the intensity of the first high-intensity laser beam 101b is increased so as to increase the amount of the molten metal 114 around the welding surface 112 of the first member 110. Further, the intensity of the second high-intensity laser beam 101c is increased so as to increase the amount of the second molten metal 124 around the welding surface 122 of the second member 120. (b2) When the width (size in the X direction) of the gap 130 decreases, the intensity of the first high-intensity laser beam 101b is reduced so as to reduce the amount of the molten metal 114 around the welding surface 111 of the first member 110. Further, the intensity of the second high-intensity laser beam 101c is reduced so as to reduce the amount of the molten metal around the welding surface 122 of the second member 120.

<Configuration>

Next, the configuration of a fusion welding apparatus used for the fusion welding method according to this embodiment will be described.

Figure 5A:
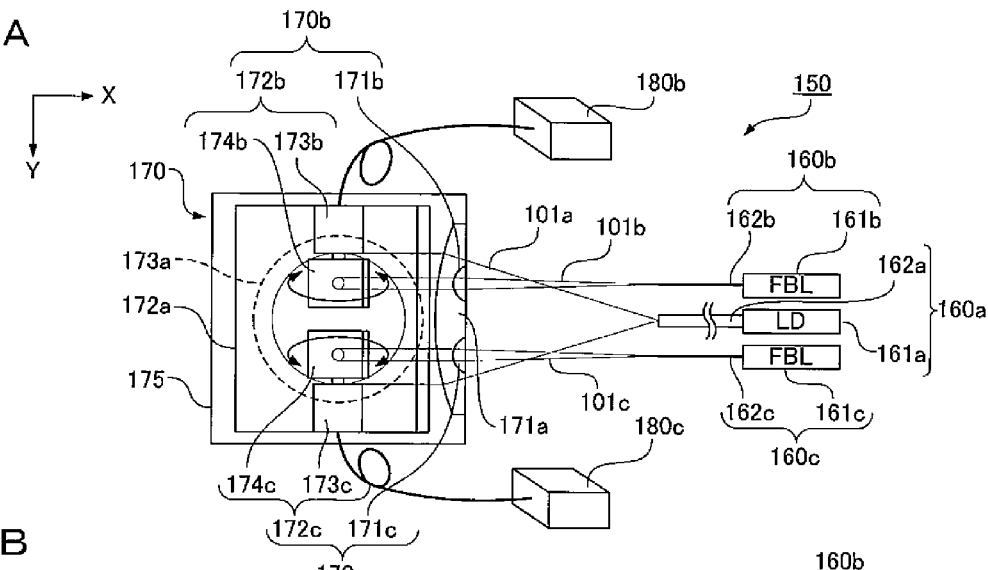
FIG. 5A is a top view of a fusion welding apparatus in the first embodiment.
Figure 5B:
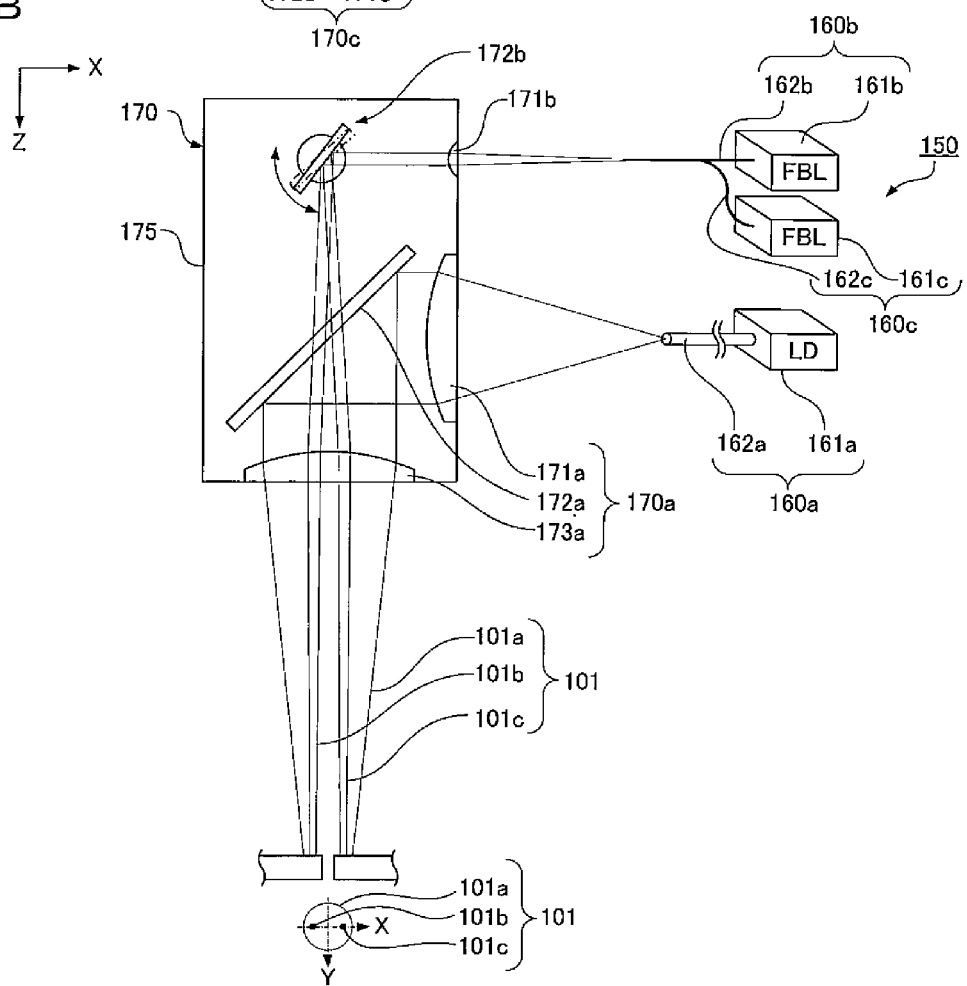
FIG. 5B is a front view thereof.

As an example, as shown in FIGS. 5A and 5B, a fusion welding apparatus 150 includes a semiconductor laser device 160a, a first fiber laser device 160b, a second fiber laser device 160c, an optical system 170, a first control device 180b, a second control device 180c, and the like. The fusion welding apparatus 150 is a laser torch for outputting the hybrid laser beam 101.

For the semiconductor laser device 160a, the first fiber laser device 160b, and the second fiber laser device 160c to share an excitation light source, the low-intensity laser beam 101a has a wavelength of 915 nm, and the first high-intensity laser beam 101b and the second high-intensity laser beam 101c each have a wavelength of 1070 nm.

When the excitation light source is not shared, the wavelength of the low-intensity laser beam 101a is not limited to 915 nm, and the wavelengths of the first high-intensity laser beam 101b and the second high-intensity laser beam 101c are not limited to 1070 nm.

<Semiconductor Laser Device 160a>

The semiconductor laser device 160a outputs the low-intensity laser beam 101a. The semiconductor laser device 160a includes an excitation light source 161a and an LD optical fiber 162a. A semiconductor laser beam generated by the excitation light source 161a is transmitted through the LD optical fiber 162a and is output from the output end (numerical aperture: NA≧0.15) of the LD optical fiber 162a as the low-intensity laser beam 101a (wavelength: λ=915 nm).

The LD optical fiber 162a may be either of a graded-index type (GI type) or a step-index type (SI type).

<First Fiber Laser Device 160b>

The first fiber laser device 160b outputs the first high-intensity laser beam 101b. The first fiber laser device 160b includes an excitation light source 161b and a first FBL optical fiber 162b. A laser beam generated by the excitation light source 161b is transmitted through the first FBL optical fiber 162b and is output from the output end (numerical aperture: NA<0.1) of the first FBL optical fiber 162b as the first high-intensity laser beam 101b (wavelength: λ=1070 nm).

<Second Fiber Laser Device 160c>

The second fiber laser device 160c outputs the second high-intensity laser beam 101c. The second fiber laser device 160c includes an excitation light source 161c and a second FBL optical fiber 162c. A laser beam generated by the excitation light source 161c is transmitted through the second FBL optical fiber 162c and is output from the output end (numerical aperture: NA<0.1) of the second FBL optical fiber 162c as the second high-intensity laser beam 101c (wavelength: λ=1070 nm).

<Optical System 170>

The optical system 170 generates the hybrid laser beam 101 from the low-intensity laser beam 101a, the first high-intensity laser beam 101b, and the second high-intensity laser beam 101c. The optical system 170 mainly includes a low-intensity laser system 170a, a first high-intensity laser system 170b, and a second high-intensity laser system 170c. FIG. 5A shows a housing 175 for housing the optical system 170 cut along an X-Y plane to make it easy to see the inner structure of the optical system 170. FIG. 5B shows the housing 175 for housing the optical system 170 cut along an X-Z plane.

<Low-Intensity Laser System 170a>

In the low-intensity laser system 170a, an LD collimate lens 171a is placed in the middle of the side surface of the housing 175. The optical axis direction of the LD collimate lens 171a is adjusted in parallel with the X direction. A dichroic mirror 172a is placed in the housing 175. The normal direction of the dichroic mirror 172a is adjusted at 45 degrees with respect to the X direction and the Z direction. A condenser lens 173a is placed in the middle of the lower surface of the housing 175. The optical axis direction of the condenser lens 173a is adjusted in parallel with the Z direction.

When the low-intensity laser beam 101a is output from the output end of the LD optical fiber 162a, the output low-intensity laser beam 101a is collimated by the LD collimate lens 171a. The collimated low-intensity laser beam 101a is incident on the dichroic mirror 172a from the X direction. The incident low-intensity laser beam 101a is reflected about 90 degrees downward by the dichroic mirror 172a, and the reflected low-intensity laser beam 101a is collected on the part to be welded by the condenser lens 173a.

<First High-Intensity Laser System 170b>

In the first high-intensity laser system 170b, a first FBL collimate lens 171b is placed on the upper rear side of the side surface of the housing 175. The optical axis direction of the first FBL collimate lens 171b is adjusted in parallel with the X direction. A first galvano-scanner 172b is placed on an upper rear side in the housing 175. The first high-intensity laser system 170b and the low-intensity laser system 170a share the dichroic mirror 172a and the condenser lens 173a.

The first galvano-scanner 172b includes a first servomotor 173b and a first galvano-mirror 174b. The first galvano-scanner 172b is controlled by the first control device 180b to precisely adjust the application position of the first high-intensity laser beam 101b.

The first galvano-mirror 174b is mounted to the rotating shaft of the first servomotor 173b. The rotating shaft direction of the first servomotor 173b is adjusted in parallel with the Y direction. The first galvano-mirror 174b is placed on the optical axis of the first FBL collimate lens 171b. The first galvano-mirror 174b is rotated around the rotating shaft of the first servomotor 173b, so that the application position of the first high-intensity laser beam 101b changes in the X direction.

When the first high-intensity laser beam 101b is output from the output end of the first FBL optical fiber 162b, the output first high-intensity laser beam 101b is collimated by the first FBL collimate lens 171b. The collimated first high-intensity laser beam 101b is reflected about 90 degrees downward by the first galvano-mirror 174b. The reflected first high-intensity laser beam 101b is incident on the dichroic mirror 172a from the Z direction. The incident first high-intensity laser beam 101b passes through the dichroic mirror 172a. The first high-intensity laser beam 101b having passed through the dichroic mirror 172a is collected near the optical axis of the low-intensity laser beam 101a by the condenser lens 173a.

<Second High-Intensity Laser System 170c>

In the second high-intensity laser system 170c, a second FBL collimate lens 171c is placed on the upper front side of the side surface of the housing 175. The optical axis direction of the second FBL collimate lens 171c is adjusted in parallel with the X direction. A second galvano-scanner 172c is placed on an upper front side in the housing 175. The second high-intensity laser system 170c and the low-intensity laser system 170a share the dichroic mirror 172a and the condenser lens 173a.

The second galvano-scanner 172c includes a second servomotor 173c and a second galvano-mirror 174c. The second galvano-scanner 172c is controlled by the second control device 180c to precisely adjust the application position of the second high-intensity laser beam 101c.

The second galvano-mirror 174c is mounted to the rotating shaft of the second servomotor 173c. The rotating shaft direction of the second servomotor 173c is adjusted in parallel with the Y direction. The second galvano-mirror 174c is placed on the optical axis of the second FBL collimate lens 171c. The second galvano-mirror 174c is rotated around the rotating shaft of the second servomotor 173c, so that the application position of the second high-intensity laser beam 101c changes in the X direction.

When the second high-intensity laser beam 101c is output from the output end of the second FBL optical fiber 162c, the output second high-intensity laser beam 101c is collimated by the second FBL collimate lens 171c. The collimated second high-intensity laser beam 101c is reflected about 90 degrees downward by the second galvano-mirror 174c. The reflected second high-intensity laser beam 101c is incident on the dichroic mirror 172a from the Z direction. The incident second high-intensity laser beam 101c passes through the dichroic mirror 172a. The second high-intensity laser beam 101c having passed through the dichroic mirror 172a is collected near the optical axis of the low-intensity laser beam 101a by the condenser lens 173a.

<First Control Device 180b>

The first control device 180b controls the driving of the first servomotor 173b. The rotation angle of the rotating shaft of the first servomotor 173b is controlled by the first control device 180b.

<Second Control Device 180c>

The second control device 180c controls the driving of the second servomotor 173c. The rotation angle of the rotating shaft of the second servomotor 173c is controlled by the second control device 180c.

<Complement>

Figure 6:
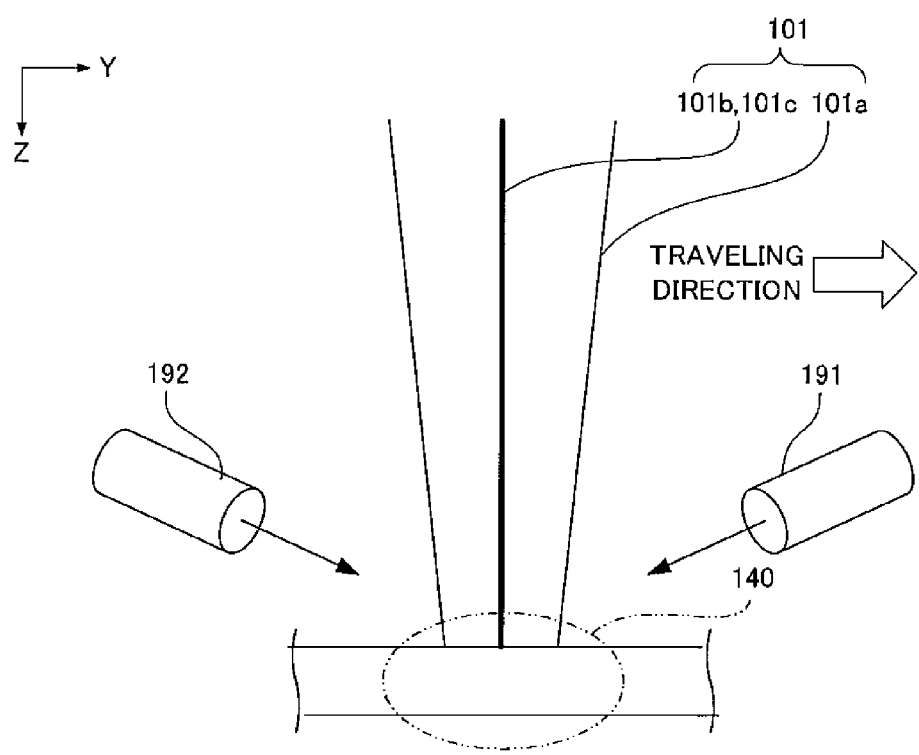
FIG. 6 shows a part to be welded and the periphery in the first embodiment.

As shown in FIG. 6, a first blow-off port 191 is placed on the front (side in the traveling direction) of the hybrid laser beam 101 when viewed from the X direction. A second blow-off port 192 is placed on the rear (opposite side of the traveling direction) of the hybrid laser beam 101. An inactive gas (assist gas) blown off from the first blow-off port 191 and an inactive gas blown off from the second blow-off port 192 collide with each other in the periphery 140 of the gap (around the application portion of the hybrid laser beam 101). This can completely prevent the oxidation of the periphery 140 of the gap. Even with a gap in the part to be welded, fusion welding such as brazing can be performed.

Generally, if a metal surface is oxidized, brazing and welding cannot be performed. Thus, flux is applied beforehand to the part to be welded to remove an oxidized coating. Since the fusion welding method according to this embodiment is a type of brazing and soldering, flux may be applied beforehand to the part to be welded as required. The atmosphere around the periphery 140 of the gap may be concurrently formed by an inactive gas (assist gas) such as an argon gas and a nitrogen gas that prevent oxidation, and a hydrogen mixed gas with reduction action.

FUSION WELDING EXAMPLE 1

First Butt-Welding Example

In the following description, the hybrid laser beam 101 is applied directly from above to butt-weld a first member 110a and a second member 120a. The drawings show a state as viewed from the traveling direction of the hybrid laser beam 101. In the drawings, the position of the optical axis of the low-intensity laser beam 101a is indicated by a dashed line.

Figure 7A:
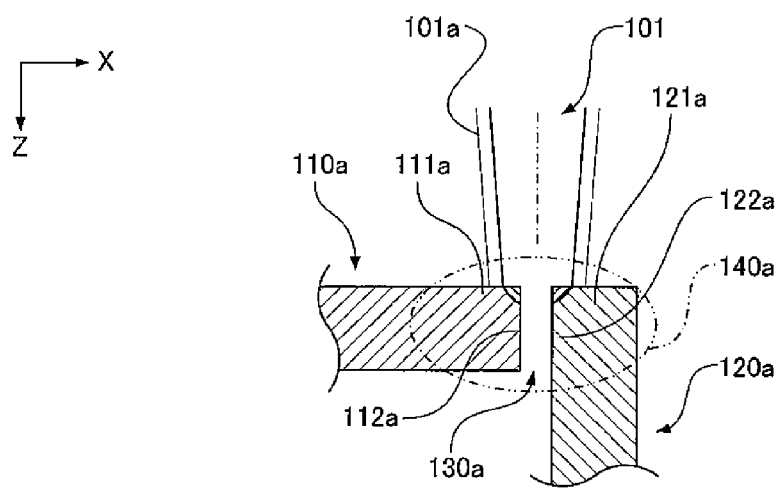
FIGS. 7A to 7C show a fusion welding process when the fusion welding method in the first embodiment is used in a first butt-welding example.
Figure 7B:
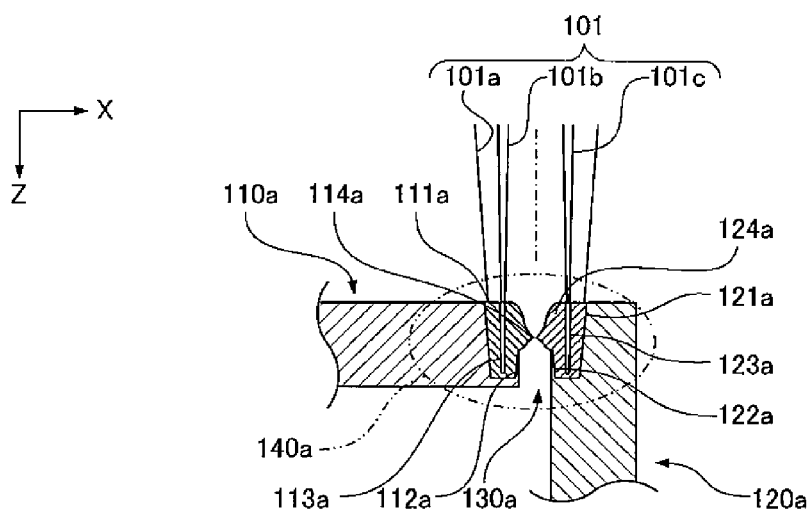
Figure 7C:
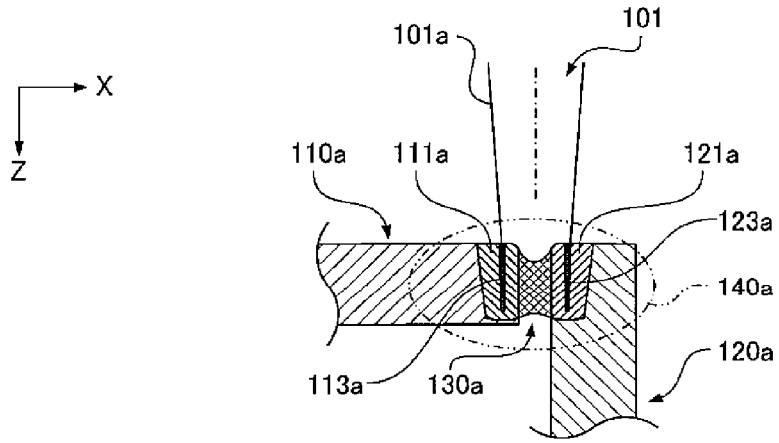

As an example, as shown in FIGS. 7A to 7C, the first member 110a and the second member 120a are herein metal plates. The first member 110a is placed so as to extend in the X direction. The second member 120a is placed so as to extend in the Z direction. The side surface of the right end of the first member 110a is butted against the side surface of the upper end of the second member 120a. The upper surface of the right end of the first member 110a is flush with the upper surface of the upper end of the second member 120a. A gap 130a extends along the Y direction between the right end of the first member 110a and the upper end of the second member 120a. The gap 130a varies in width (size in the X direction). The hybrid laser beam 101 is applied to the gap 130a directly from above while being moved along the Y direction.

At this time, with a focus on a predetermined portion in a periphery 140a of the gap, the right end of the first member 110a in the predetermined portion is a first part to be welded 111a, and the upper end of the second member 120a in the predetermined portion is a second part to be welded 121a. The side surface of the first part to be welded 111a is a first surface to be welded 112a, and the side surface of the second part to be welded 121a is a second surface to be welded 122a. In this case, the first part to be welded 111a and the second part to be welded 121a are welded by (Step A1) to (Step A3) below.

(Step A1) First, as shown in FIG. 7A, the front middle portion of the low-intensity laser beam 101a approaches the gap 130a between the first part to be welded 111a and the second part to be welded 121a. Then, the front left portion of the low-intensity laser beam 101a approaches the first part to be welded 111a. The front right portion of the low-intensity laser beam 101a approaches the second part to be welded 121a.

Accordingly, the first part to be joined 111a is gradually heated and melted by the front left portion of the low-intensity laser beam 101a. Similarly, the second part to be welded 121a is gradually heated and melted by the front right portion of the low-intensity laser beam 101a.

(Step A2) Then, as shown in FIG. 7B, the front middle portion of the low-intensity laser beam 101a passes through the gap 130a between the first part to be welded 111a and the second part to be welded 121a, and the optical axis portion of the low-intensity laser beam 101a approaches the gap 130a. Substantially at the same time, the front left portion of the low-intensity laser beam 101a passes through the first part to be welded 111a, and the first high-intensity laser beam 101b approaches the first part to be welded 111a. The front right portion of the low-intensity laser beam 101a passes through the second part to be welded 121a, and the second high-intensity laser beam 101c approaches the second part to be welded 121a.

Accordingly, the first part to be welded 111a is instantaneously heated to a high temperature by the first high-intensity laser beam 101b, and a first keyhole 113a extending directly below from the surface of the first part to be welded 111a is formed in the first part to be welded 111a. Heat is supplied via the first keyhole 113a to the first surface to be welded 112a. The heat supplied to the first surface to be welded 112a melts the vicinity of the first surface to be welded 112a.

Similarly, the second part to be welded 121a is instantaneously heated to a high temperature by the second high-intensity laser beam 101c, and a second keyhole 123a extending directly below from the surface of the second part to be welded 121a is formed in the second part to be welded 121a. Heat is supplied via the second keyhole 123a to the second surface to be welded 122a. The heat supplied to the second surface to be welded 122a melts the vicinity of the second surface to be welded 122a.

At this time, molten metal 114a around the first surface to be welded 112a starts flowing down by gravity and is held on the first surface to be welded 112 by surface tension. Molten metal 124a around the second surface to be welded 122a starts flowing down by gravity and is held on the second surface to be welded 122a by surface tension. The molten metal 114a held on the first surface to be welded 112a by surface tension is brought into contact with the molten metal 124a held on the second surface to be welded 122a by surface tension. The molten metal 114a and the molten metal 124a function as a brazing filler metal to instantaneously fill the gap 130a between the first part to be welded 111a and the second part to be welded 121a.

(Step A3) Then, as shown in FIG. 7C, the first high-intensity laser beam 101b passes through the first part to be welded 111a, and the rear left portion of the low-intensity laser beam 101a approaches the first part to be welded 111a. The second high-intensity laser beam 101c passes through the second part to be welded 121a, and the rear right portion of the low-intensity laser beam 101a approaches the second part to be welded 121a. Then, the optical axis portion of the low-intensity laser beam 101a passes through the gap 130a between the first part to be welded 111a and the second part to be welded 121a, and the rear middle portion of the low-intensity laser beam 101a approaches the gap 130a.

Accordingly, the first part to be welded 111a is gradually cooled by the rear left portion of the low-intensity laser beam 101a. As the rear left portion of the low-intensity laser beam 101a passes through the first part to be welded 111a and the low-intensity laser beam 101a moves away from the first part to be welded 111a, the first keyhole 113a solidifies.

Similarly, the second part to be welded 121a is gradually cooled by the rear right portion of the low-intensity laser beam 101a. As the rear right portion of the low-intensity laser beam 101a passes through the second part to be welded 121a and the low-intensity laser beam 101a moves away from the second part to be welded 121a, the second keyhole 123a solidifies.

At this time, as the rear left portion of the low-intensity laser beam 101a gradually becomes smaller, heating to the first part to be welded 111a is gradually reduced. Similarly, as the rear right portion of the low-intensity laser beam 101a gradually becomes smaller, heating to the second part to be welded 121a is gradually reduced.

This can prevent molten metal from rapidly shrinking during the solidification. Further, a problem caused by stress relaxation which cannot keep up with the solidification to cause cracks in a welded part can be avoided.

Figure 8:
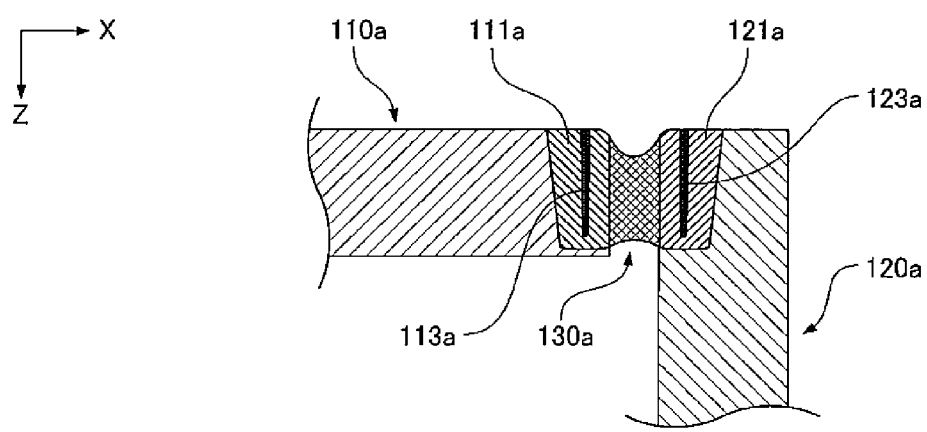
FIG. 8 shows a fusion welding result when the fusion welding method in the first embodiment is used in the first butt-welding example.

Then, as shown in FIG. 8, the first keyhole 113a, the second keyhole 123a, and the gap 130a between the first part to be welded 111a and the second part to be welded 121a are all filled with metal, and the first member 110a and the second member 120a are welded by brazing.

In the case where the hybrid laser beam 101 is applied directly from above, the intensity of the first high-intensity laser beam 101b may be increased, or the optical axis of the low-intensity laser beam 101a may be displaced toward the first member 110a. This can increase the amount of the molten metal 114a from the first part to be welded 111a.

FUSION WELDING EXAMPLE 2

Second Butt-Welding Example

Next, in the following description, the hybrid laser beam 101 is applied directly from the side to butt-weld a first member 110b and a second member 120b. The drawings show a state as viewed from the traveling direction of the hybrid laser beam 101. In the drawings, the position of the optical axis of the low-intensity laser beam 101a is indicated by a dashed line.

Figure 9A:
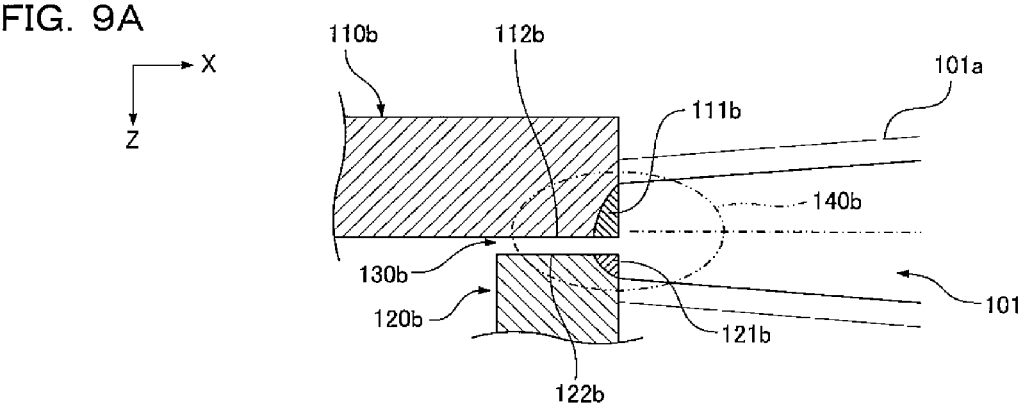
FIGS. 9A to 9C show a fusion welding process when the fusion welding method in the first embodiment is used in a second butt-welding example.
Figure 9B:
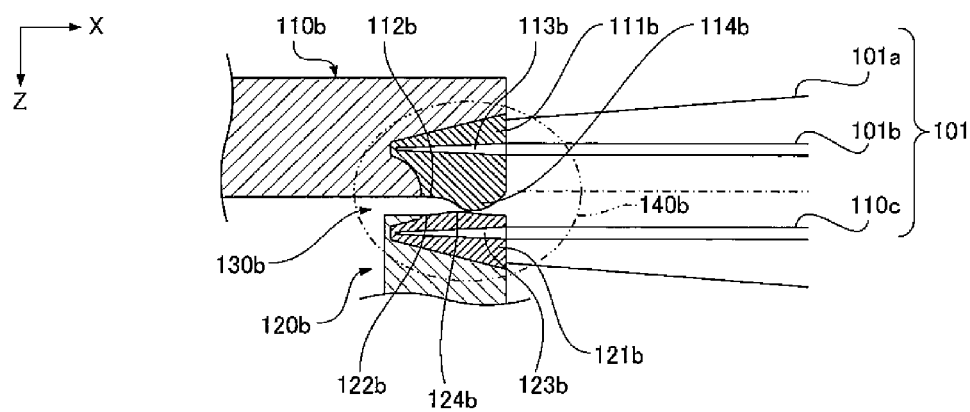
Figure 9C:
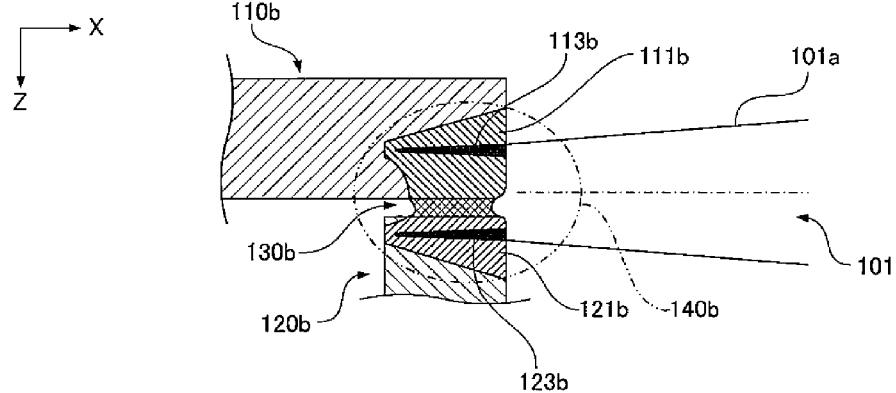

As an example, as shown in FIGS. 9A to 9C, the first member 110b and the second member 120b are herein metal plates. The first member 110b is placed so as to extend in the X direction. The second member 120b is placed so as to extend in the Z direction. The lower surface of the right end of the first member 110b is butted against the upper surface of the upper end of the second member 120b. The side surface of the right end of the first member 110b is flush with the side surface of the upper end of the second member 120b. A gap 130b extends along the Y direction between the right end of the first member 110b and the upper end of the second member 120b. The gap 130b varies in width (size in the Z direction). The hybrid laser beam 101 is applied to the gap 130b directly from the side while being moved along the Y direction.

At this time, with a focus on a predetermined portion in a periphery 140b of the gap, the right end of the first member 110b in the predetermined portion is a first part to be welded 111b, and the upper end of the second member 120b in the predetermined portion is a second part to be welded 121b. The lower surface of the first part to be welded 111b is a first surface to be welded 112b, and the upper surface of the second part to be welded 121b is a second surface to be welded 122b. In this case, the first part to be welded 111b and the second part to be welded 121b are welded by (Step B1) to (Step B3) below.

(Step B1) First, as shown in FIG. 9A, the front middle portion of the low-intensity laser beam 101a approaches the gap 130b between the first part to be welded 111b and the second part to be welded 121b. Then, the front upper portion of the low-intensity laser beam 101a approaches the first part to be welded 111b. The front lower portion of the low-intensity laser beam 101a approaches the second part to be welded 121b.

Accordingly, the first part to be welded 111b is gradually heated and melted by the front upper portion of the low-intensity laser beam 101a. Similarly, the second part to be welded 121b is gradually heated and melted by the front lower portion of the low-intensity laser beam 101a.

(Step B2) Then, as shown in FIG. 9B, the front middle portion of the low-intensity laser beam 101*a* passes through the gap 130*b* between the first part to be welded 111*b* and the second part to be welded 121*b*, and the optical axis portion of the low-intensity laser beam 101*a* approaches the gap 130*b*. Substantially at the same time, the front upper portion of the low-intensity laser beam 101*a* passes through the first part to be welded 111*b*, and the first high-intensity laser beam 101*b* approaches the first part to be welded 111*b*. The front lower portion of the low-intensity laser beam 101*a* passes through the second part to be welded 121*b*, and the second high-intensity laser beam 101*c* approaches the second part to be welded 121*b*.

Accordingly, the first part to be welded 111*b* is instantaneously heated to a high temperature by the first high-intensity laser beam 101*b*, and a first keyhole 113*b* extending directly to the side from the surface of the first part to be welded 111*b* is formed in the first part to be welded 111*b*. Heat is supplied via the first keyhole 113*b* to the first surface to be welded 112*b*. The heat supplied to the first surface to be welded 112*b* melts the vicinity of the first surface to be welded 112*b*.

Similarly, the second part to be welded 121*b* is instantaneously heated to a high temperature by the second high-intensity laser beam 101*c*, and a second keyhole 123*b* extending directly to the side from the surface of the second part to be welded 121*b* is formed in the second part to be welded 121*b*. Heat is supplied via the second keyhole 123*b* to the second surface to be welded 122*b*. The heat supplied to the second surface to be welded 122*b* melts the vicinity of the second surface to be welded 122*b*.

At this time, molten metal 114*b* around the first surface to be welded 112*b* starts flowing toward the second surface to be welded 122*b* by gravity and is brought into contact with molten metal 124*b* around the second surface to be welded 122*b*. The molten metal 114*b* and the molten metal 124*b* function as a brazing filler metal to instantaneously fill the gap 130*b* between the first part to be welded 111*b* and the second part to be welded 121*b*.

(Step B3) Then, as shown in FIG. 9C, the first high-intensity laser beam 101*b* passes through the first part to be welded 111*b*, and the rear upper portion of the low-intensity laser beam 101*a* approaches the first part to be welded 111*b*. The second high-intensity laser beam 101*c* passes through the second part to be welded 121*b*, and the rear lower portion of the low-intensity laser beam 101*a* approaches the second part to be welded 121*b*. Then, the optical axis portion of the low-intensity laser beam 101*a* passes through the gap 130*b* between the first part to be welded 111*b* and the second part to be welded 121*b*, and the rear middle portion of the low-intensity laser beam 101*a* approaches the gap 130*b*.

Accordingly, the first part to be welded 111*b* is gradually cooled by the rear upper portion of the low-intensity laser beam 101*a*. As the rear upper portion of the low-intensity laser beam 101*a* passes through the first part to be welded 111*b* and the low-intensity laser beam 101*a* moves away from the first part to be welded 111*b*, the first keyhole 113*b* solidifies.

Similarly, the second part to be welded 121*b* is gradually cooled by the rear lower portion of the low-intensity laser beam 101*a*. As the rear lower portion of the low-intensity laser beam 101*a* passes through the second part to be welded 121*b* and the low-intensity laser beam 101*a* moves away from the second part to be welded 121*b*, the second keyhole 123*b* solidifies.

At this time, as the rear upper portion of the low-intensity laser beam 101*a* gradually becomes smaller, heating to the first part to be welded 111*b* is gradually reduced. Similarly, as the rear lower portion of the low-intensity laser beam 101*a* gradually becomes smaller, heating to the second part to be welded 121*b* is gradually reduced.

This can prevent molten metal from rapidly shrinking during the solidification. Further, a problem caused by stress relaxation which cannot keep up with the solidification to cause cracks in a welded part can be avoided.

Figure 10:
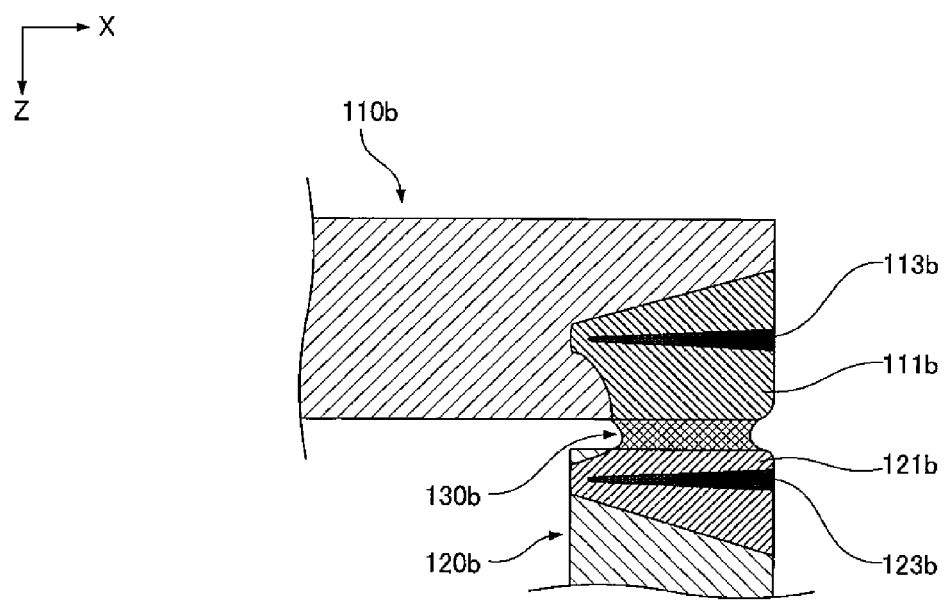
FIG. 10 shows a fusion welding result when the fusion welding method in the first embodiment is used in the second butt-welding example.

Then, as shown in FIG. 10, the first keyhole 113*b*, the second keyhole 123*b*, and the gap 130*b* between the first part to be welded 111*b* and the second part to be welded 121*b* are all filled with metal, and the first member 110*b* and the second member 120*b* are welded by brazing.

In the case where the hybrid laser beam 101 is applied directly from the side, the intensity of the first high-intensity laser beam 101*b* may be increased, or the optical axis of the low-intensity laser beam 101*a* may be displaced toward the first member 110*b*.

Specifically, the intensity of the high-intensity laser beam applied to the upper member may be higher than the intensity of the high-intensity laser beam applied to the lower member, or the optical axis of the low-intensity laser beam may be displaced toward the upper member. This can increase the amount of molten metal flowing from the upper member.

FUSION WELDING EXAMPLE 3

Fillet Welding Example

In the following description, the hybrid laser beam 101 is applied obliquely from above to fillet-weld a first member 110*c* and a second member 120*c*. The drawings show a state as viewed from the traveling direction of the hybrid laser beam 101. In the drawings, the position of the optical axis of the low-intensity laser beam 101*a* is indicated by a dashed line.

Figure 11A:
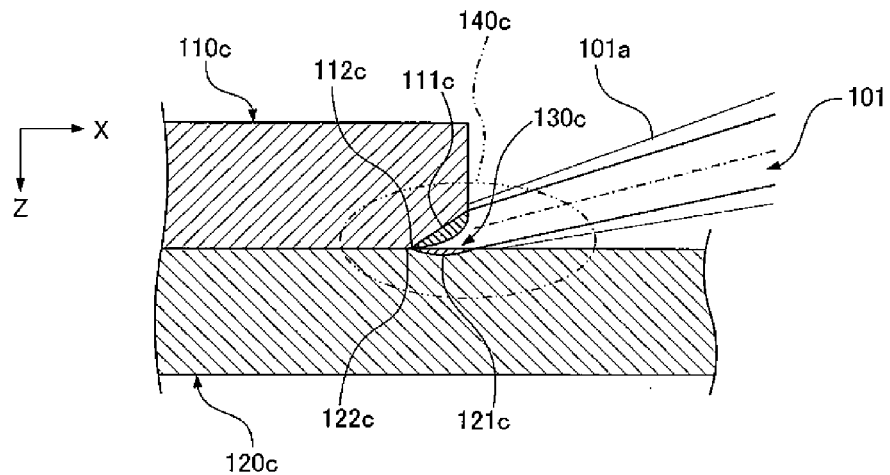
FIGS. 11A to 11C show a fusion welding process when the fusion welding method in the first embodiment is used in a fillet welding example.
Figure 11B:
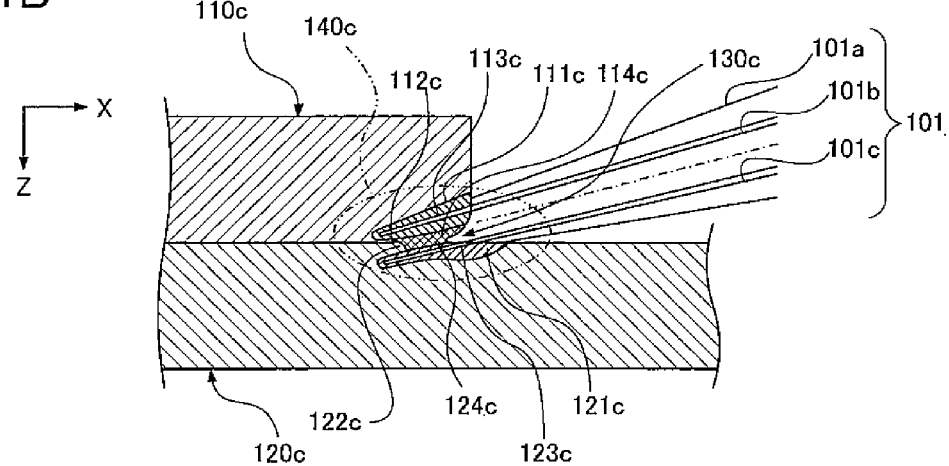
Figure 11C:
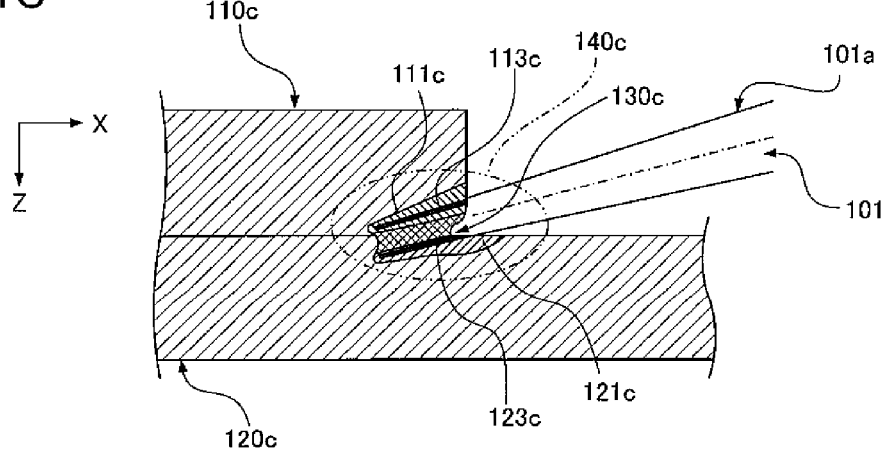

As an example, as shown in FIGS. 11A to 11C, the first member 110*c* and the second member 120*c* are herein metal plates. The first member 110*c* is placed so as to extend in the X direction. The second member 120*c* is placed so as to extend in the X direction. The lower surface of the right end of the first member 110*c* is in contact with the upper surface of the middle portion of the second member 120*c*. The side surface of the right end of the first member 110*c* is perpendicular to the upper surface of the middle portion of the second member 120*c*. A gap 130*c* extends along the Y direction between the right end of the first member 110*c* and the middle portion of the second member 120*c*. The gap 130*c* varies in width (size in the Z direction). The hybrid laser beam 101 is applied to the gap 130*c* obliquely from above while being moved along the Y direction.

At this time, with a focus on a predetermined portion in a periphery 140*c* of the gap, the right end of the first member 110*c* in the predetermined portion is a first part to be welded 111*c*, and the middle portion of the second member 120*c* in the predetermined portion is a second part to be welded 121*c*. The lower surface of the first part to be welded 111*c* is a first surface to be welded 112*c*, and the upper surface of the second part to be welded 121*c* is a second surface to be welded 122*c*. In this case, the first part to be welded 111*c* and the second part to be welded 121*c* are welded by (Step C1) to (Step C3) below.

(Step C1) First, as shown in FIG. 11A, the front middle portion of the low-intensity laser beam 101*a* approaches the gap 130*c* at the corner of the first part to be welded 111*c* and the second part to be welded 121*c*. Then, the front upper portion of the low-intensity laser beam 101*a* approaches the first part to be welded 111c. The front lower portion of the low-intensity laser beam 101a approaches the second part to be welded 121c.

Accordingly, the first part to be welded 111c is gradually heated and melted by the front upper portion of the low-intensity laser beam 101a. Similarly, the second part to be welded 121c is gradually heated and melted by the front lower portion of the low-intensity laser beam 101a.

(Step C2) Then, as shown in FIG. 11B, the front middle portion of the low-intensity laser beam 101a passes through the gap 130c at the corner of the first part to be welded 111c and the second part to be welded 121c, and the optical axis portion of the low-intensity laser beam 101a approaches the gap 130c. Substantially at the same time, the front upper portion of the low-intensity laser beam 101a passes through the first part to be welded 111c, and the first high-intensity laser beam 101b approaches the first part to be welded 111c. The front lower portion of the low-intensity laser beam 101a passes through the second part to be welded 121c, and the second high-intensity laser beam 101c approaches the second part to be welded 121c.

Accordingly, the first part to be welded 111c is instantaneously heated to a high temperature by the first high-intensity laser beam 101b, and a first keyhole 113c extending obliquely downward from the surface of the first part to be welded 111c is formed in the first part to be welded 111c. Heat is supplied via the first keyhole 113c to the first surface to be welded 112c. The heat supplied to the first surface to be welded 112c melts the vicinity of the first surface to be welded 112c.

Similarly, the second part to be welded 121c is instantaneously heated to a high temperature by the second high-intensity laser beam 101c, and a second keyhole 123c extending obliquely downward from the surface of the second part to be welded 121c is formed in the second part to be welded 121c. Heat is supplied via the second keyhole 123c to the second surface to be welded 122c. The heat supplied to the second surface to be welded 122c melts the vicinity of the second surface to be welded 122c.

At this time, molten metal 114c around the first surface to be welded 112c starts flowing toward the second surface to be welded 122c by gravity and is brought into contact with molten metal 124c around the second surface to be welded 122c. The molten metal 114c and the molten metal 124c function as a brazing filler metal to instantaneously fill the gap 130c at the corner of the first part to be welded 111c and the second part to be welded 121c.

(Step C3) Then, as shown in FIG. 11C, the first high-intensity laser beam 101b passes through the first part to be welded 111c, and the rear upper portion of the low-intensity laser beam 101a approaches the first part to be welded 111c. The second high-intensity laser beam 101c passes through the second part to be welded 121c, and the rear lower portion of the low-intensity laser beam 101a approaches the second part to be welded 121c. Then, the optical axis portion of the low-intensity laser beam 101a passes through the gap 130c at the corner of the first part to be welded 111c and the second part to be welded 121c, and the rear middle portion of the low-intensity laser beam 101a approaches the gap 130c.

Accordingly, the first part to be welded 111c is gradually cooled by the rear upper portion of the low-intensity laser beam 101a. As the rear upper portion of the low-intensity laser beam 101a passes through the first part to be welded 111c and the low-intensity laser beam 101a moves away from the first part to be welded 111c, the first keyhole 113c solidifies.

Similarly, the second part to be welded 121c is gradually cooled by the rear lower portion of the low-intensity laser beam 101a. As the rear lower portion of the low-intensity laser beam 101a passes through the second part to be welded 121c and the low-intensity laser beam 101a moves away from the second part to be welded 121c, the second keyhole 123c solidifies.

At this time, as the rear upper portion of the low-intensity laser beam 101a gradually becomes smaller, heating to the first part to be welded 111c is gradually reduced. Similarly, as the rear lower portion of the low-intensity laser beam 101a gradually becomes smaller, heating to the second part to be welded 121c is gradually reduced.

This can prevent molten metal from rapidly shrinking during the solidification. Further, a problem caused by stress relaxation which cannot keep up with the solidification to cause cracks in a welded part can be avoided.

Figure 12:
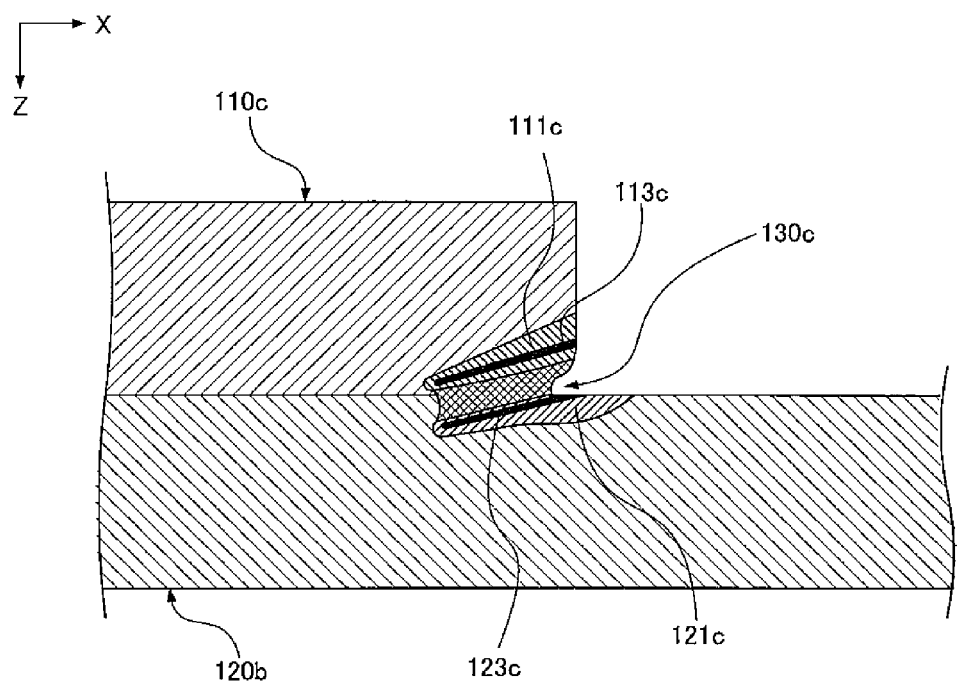
FIG. 12 shows a fusion welding result when the fusion welding method in the first embodiment is used in the fillet welding example.

Then, as shown in FIG. 12, the first keyhole 113c, the second keyhole 123c, and the gap 130c at the corner of the first part to be welded 111c and the second part to be welded 121c are all filled with metal. The first member 110c and the second member 120c are welded by brazing.

In the case where the first member 110c and the second member 120c are fillet-welded, the intensity of the first high-intensity laser beam 101b may be increased, or the optical axis of the low-intensity laser beam 101a may be displaced toward the first member 110c.

Specifically, the intensity of the high-intensity laser beam applied to the upper member may be higher than the intensity of the high-intensity laser beam applied to the lower member, or the optical axis of the low-intensity laser beam 101a may be displaced toward the upper member. This can increase the amount of molten metal flowing from the upper member.

FUSION WELDING EXAMPLE 4

Welding Example Between Members with Step Therebetween

In the following description, a first member 110d and a second member 120d are butt-welded with a step in a welding portion between the first member 110d and the second member 120d. The drawings show a state as viewed from the traveling direction of the hybrid laser beam 101. In the drawings, the position of the optical axis of the low-intensity laser beam 101a is indicated by a dashed line.

Figure 13A:
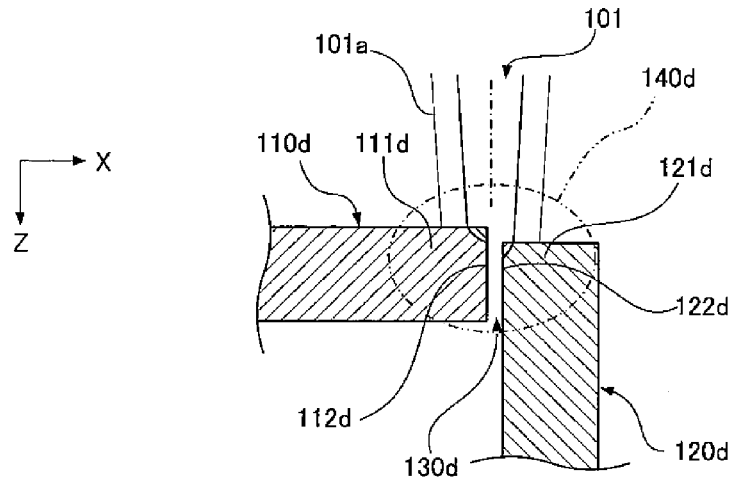
FIGS. 13A to 13C show a fusion welding process when the fusion welding method in the first embodiment is used in a fusion welding example between members with a step therebetween.
Figure 13B:
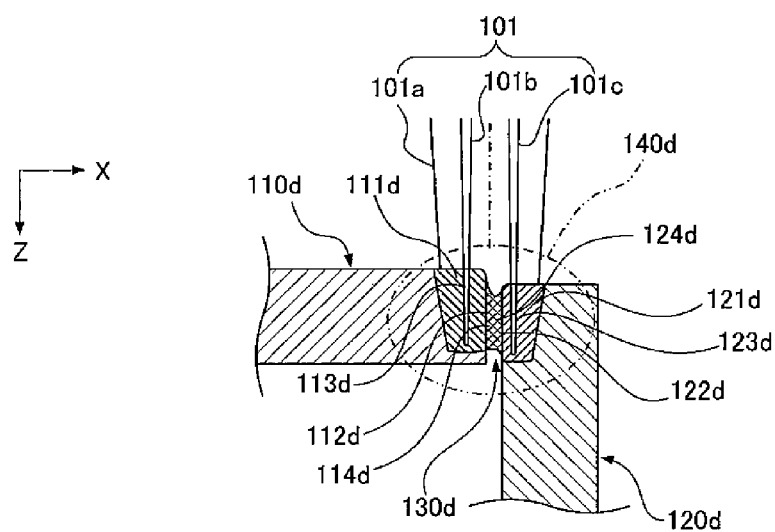
Figure 13C:
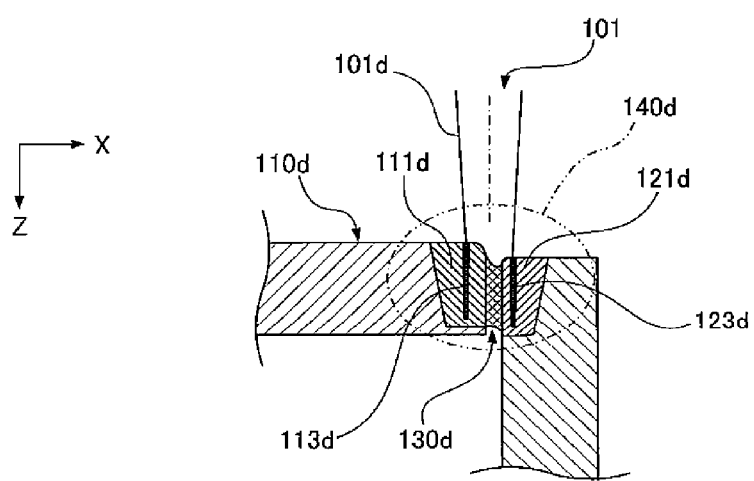

As an example, as shown in FIGS. 13A to 13C, the first member 110d and the second member 120d are herein metal plates. The first member 110d is placed so as to extend in the X direction. The second member 120d is placed so as to extend in the Z direction. The side surface of the right end of the first member 110d is butted against the side surface of the upper end of the second member 120d. The upper surface of the right end of the first member 110d is located above the upper surface of the upper end of the second member 120d. A gap 130d extends along the Y direction between the right end of the first member 110d and the upper end of the second member 120d. The gap 130d varies in width of (size in the X direction). The hybrid laser beam 101 is applied to the gap 130d directly from above while being moved along the Y direction.

At this time, with a focus on a predetermined portion in a periphery 140d of the gap, the right end of the first member 110d in the predetermined portion is a first part to be welded 111d, and the upper end of the second member 120d in the predetermined portion is a second part to be welded 121d. The side surface of the first part to be welded 111d is a first surface to be welded 112*d*, and the side surface of the second part to be welded 121*d* is a second surface to be welded 122*d*. In this case, the first part to be welded 111*d* and the second part to be welded 121*d* are welded as in fusion welding by (Step A1) to (Step A3) above.

Figure 14A:
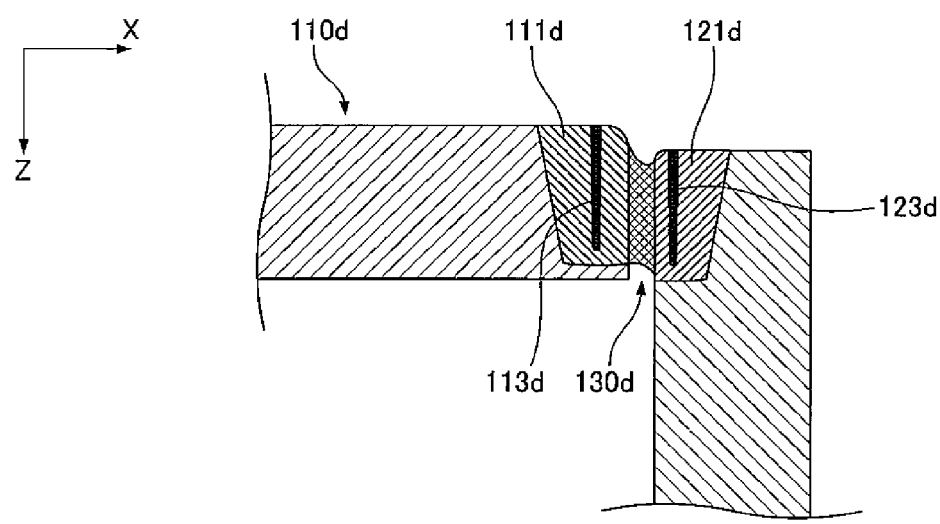
FIG. 14 shows a fusion welding result when the fusion welding method in the first embodiment is used in the fusion welding example between the members with the step therebetween.

Then, as shown in FIG. 14, a first keyhole 113*d*, a second keyhole 123*d*, and the gap 130*d* between the first part to be welded 111*d* and the second part to be welded 121*d* are all filled with metal, and the first member 110*d* and the second member 120*d* are welded by brazing.

In the case where there is the step between the members, the intensity of the first high-intensity laser beam 101*b* may be increased, or the optical axis of the low-intensity laser beam 101*a* may be displaced toward the first member 110*d*.

Specifically, the intensity of the high-intensity laser beam applied to the higher member may be higher than the intensity of the high-intensity laser beam applied to the lower member, or the optical axis of the low-intensity laser beam may be displaced toward the higher member. This can increase the amount of molten metal flowing from the higher member.

FUSION WELDING EXAMPLE 5

Fusion Welding Example Between Different Kinds of Metals

In the following description, a first member 110*e* and a second member 120*e* of different kinds of metals are butt-welded. The drawings show a state as viewed from the traveling direction of the hybrid laser beam 101. In the drawings, the position of the optical axis of the low-intensity laser beam 101*a* is indicated by a dashed line.

Figure 15A:
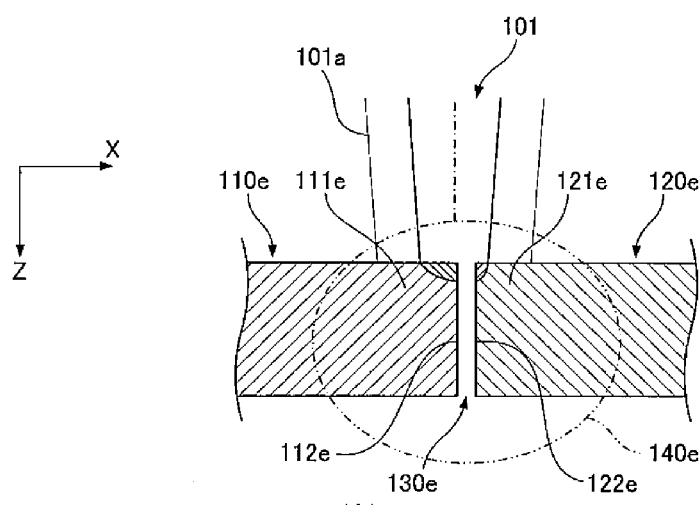
FIGS. 15A to 15C show a fusion welding process when the fusion welding method in the first embodiment is used in a fusion welding example between different types of metals.
Figure 15B:
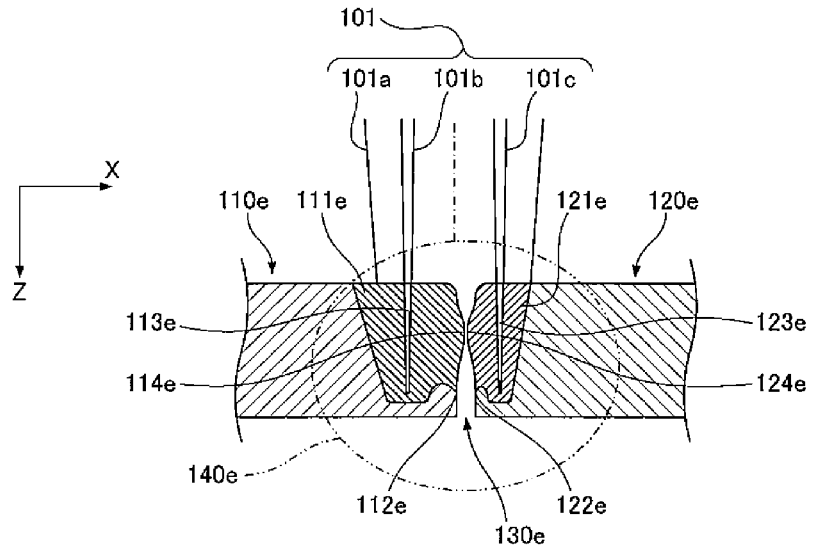
Figure 15C:
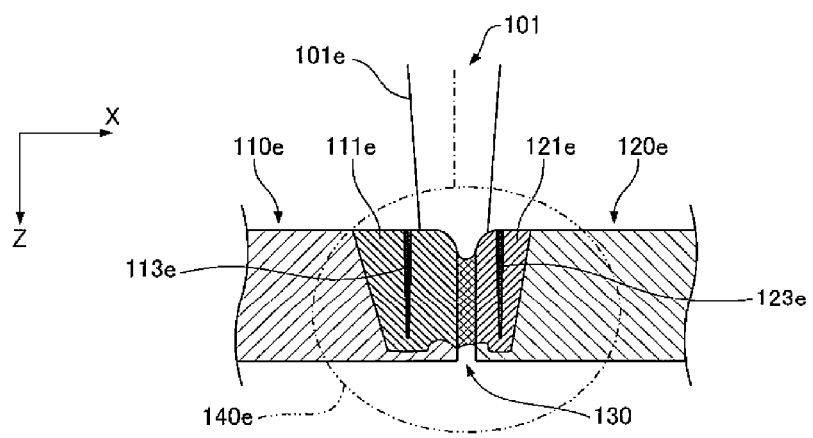

As an example, as shown in FIGS. 15A to 15C, the first member 110*e* is herein a copper plate. The second member 120*e* is an aluminum plate. The first member 110*e* is placed so as to extend in the X direction. The second member 120*e* is placed so as to extend in the X direction. The side surface of the right end of the first member 110*e* is butted against the side surface of the left end of the second member 120*e*. The upper surface of the right end of the first member 110*e* is flush with the upper surface of the left end of the second member 120*e*. A gap 130*e* extends along the Y direction between the right end of the first member 110*e* and the left end of the second member 120*e*. The gap 130*e* varies in width (size in the X direction). The hybrid laser beam 101 is applied to the gap 130*e* directly from above while being moved along the Y direction.

At this time, with a focus on a predetermined portion in a periphery 140*e* of the gap, the right end of the first member 110*e* in the predetermined portion is a first part to be welded 111*e*, and the left end of the second member 120*e* in the predetermined portion is a second part to be welded 121*e*. The side surface of the first part to be welded 111*e* is a first surface to be welded 112*e*, and the side surface of the second part to be welded 121*e* is a second surface to be welded 122*e*. In this case, the first part to be welded 111*e* and the second part to be welded 121*e* are welded as in fusion welding by (Step A1) to (Step A3) above.

Figure 16:
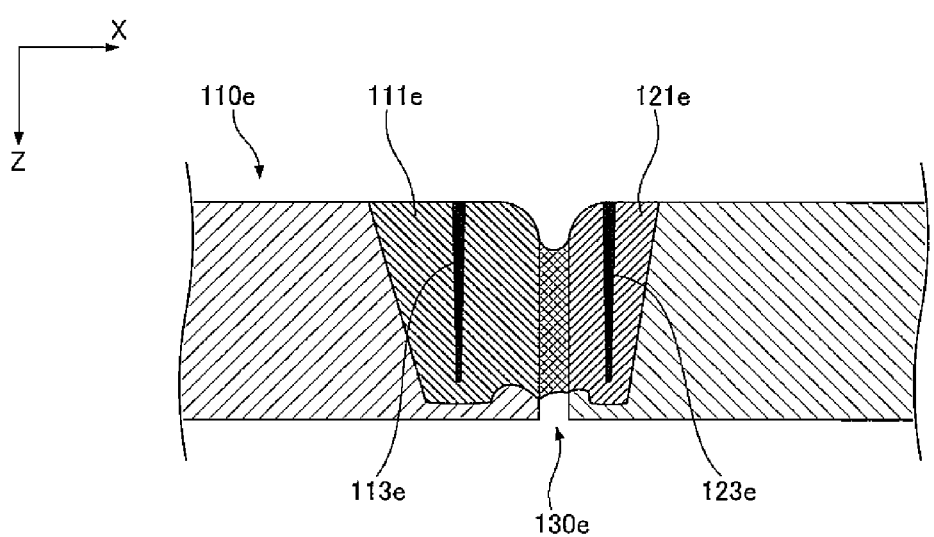
FIG. 16 shows a fusion welding result when the fusion welding method in the first embodiment is used in the fusion welding example between the different types of metals.

Then, as shown in FIG. 16, a first keyhole 113*e*, a second keyhole 123*e*, and the gap 130*e* between the first part to be welded 111*e* and the second part to be welded 121*e* are all filled with metal, and the first member 110*e* and the second member 120*e* are welded by brazing.

In the case where the members are of different kinds of metals, the intensity of the first high-intensity laser beam 101*b* may be increased, or the optical axis of the low-intensity laser beam 101*a* may be displaced toward the first member 110*e*.

Specifically, the intensity of the high-intensity laser beam applied to a member having higher heat capacity may be higher than the intensity of the high-intensity laser beam applied to a member having lower heat capacity, or the optical axis of the low-intensity laser beam may be displaced toward the member having higher heat capacity. This can achieve the balance of the amount of molten metal between the member having higher heat capacity and the member having lower heat capacity.

Alternatively, the intensity of the high-intensity laser beam applied to a member having lower laser absorbance may be higher than the intensity of the high-intensity laser beam applied to a member having higher laser absorbance, or the optical axis of the low-intensity laser beam 101*a* may be displaced toward the member having lower laser absorbance. This can achieve the balance of the amount of molten metal between the member having lower laser absorbance and the member having higher laser absorbance.

<Summary>

As described above, according to this embodiment, the hybrid laser beam is used to fill the gap in the part to be welded with the molten metal from both sides thereof. Thus, the first member and the second member can be welded by brazing even if there is a gap in the part to be welded between the butted first member and second member. Further, the keyholes are formed in the first member and the second member with a predetermined penetration width, thereby completely preventing spatters from entering through the gap.

Further, the low-intensity laser beam gradually cools the welded part, thereby completely preventing welding defects such as cracks or porosities. Meanwhile, the first high-intensity laser beam and the second high-intensity laser beam instantaneously melt the application portion, thereby reducing thermal effects on the periphery to allow for fusion welding at high speed.

(Second Embodiment)

Now, a second embodiment according to the present invention will be described.

A fusion welding apparatus in this embodiment has the same configuration as the fusion welding apparatus 150 in the first embodiment except that an SI optical fiber is used as an LD optical fiber 162*a*, and thus a description thereof will be omitted.

<Outline>

Figure 17:
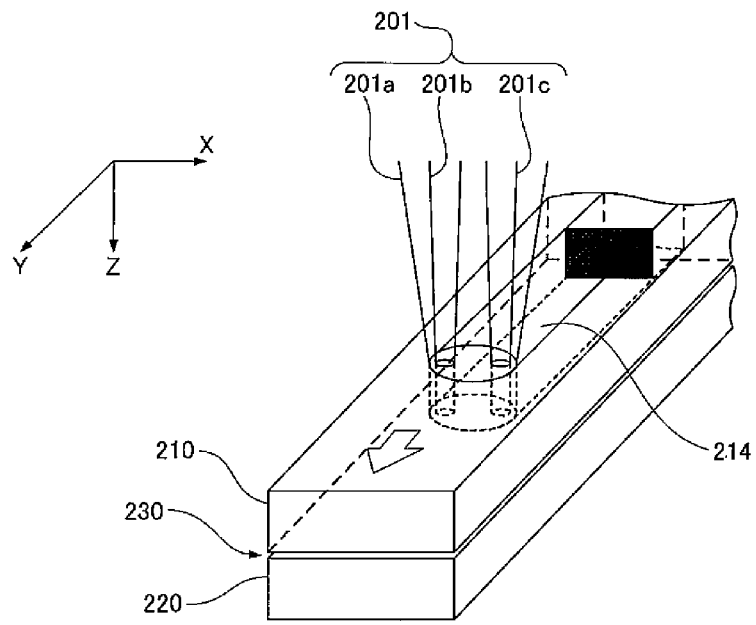
FIG. 17 shows the outline of a bead-on-plate by a fusion welding method in a second embodiment.
Figure 18:
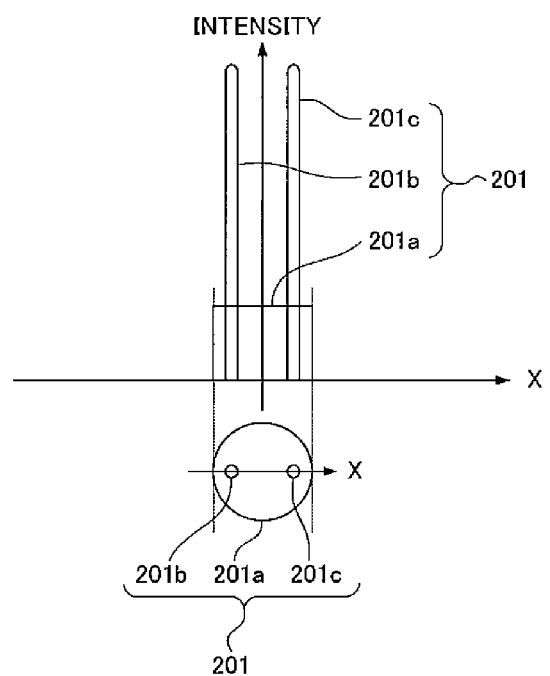
FIG. 18 shows the intensity distribution of a hybrid laser beam used for the bead-on-plate by the fusion welding method in the second embodiment.

First, in a fusion welding method of this embodiment, as shown in FIG. 17, a hybrid laser beam 201 of FIG. 18 is used to lap-weld a first member 210 and a second member 220 in a bead-on-plate. At this time, the hybrid laser beam 201 is applied to the first member 210 while being moved along a Y direction to form a molten pool 214 in the first member 210.

<Hybrid Laser Beam 201>

The hybrid laser beam 201 is obtained by mixing, on a low-intensity laser beam 201*a*, a first high-intensity laser beam 201*b* and a second high-intensity laser beam 201*c*. The low-intensity laser beam 201*a* has intensity distribution in a top hat shape. The first high-intensity laser beam 201*b* and the second high-intensity laser beam 201*c* are distributed to the outer periphery of the low-intensity laser beam 201*a* with the optical axis of the low-intensity laser beam 201*a* held between the first high-intensity laser beam 201*b* and the second high-intensity laser beam 201*c*.

Further, the first high-intensity laser beam 201*b* and the second high-intensity laser beam 201*c* each have a smaller application area and a higher intensity peak than the low-intensity laser beam 201a. The intensity of the low-intensity laser beam 201a is set so that a keyhole is not formed in an application portion. The intensities of the first high-intensity laser beam 201b and the second high-intensity laser beam 201c are set so that a keyhole is formed in an application portion with the first high-intensity laser beam 201b and the second high-intensity laser beam 201c mixed on the low-intensity laser beam 201a.

As an example, the low-intensity laser beam 201a is herein set so that the focus of the low-intensity laser beam 201a is located at the middle of the first member 210. With each optical axis arranged in a first direction (X direction), the low-intensity laser beam 201a, the first high-intensity laser beam 201b, and the second high-intensity laser beam 201c travel along a second direction (Y direction) perpendicular to the first direction (X direction). The first high-intensity laser beam 201b and the second high-intensity laser beam 201c have the same intensity peak.

Figure 19A:
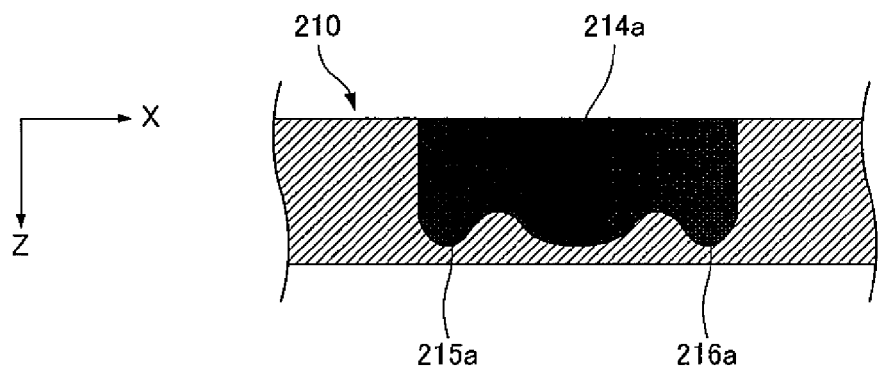
FIGS. 19A to 19C show the melting state of the bead-on-plate by the fusion welding method in the second embodiment.
Figure 19B:
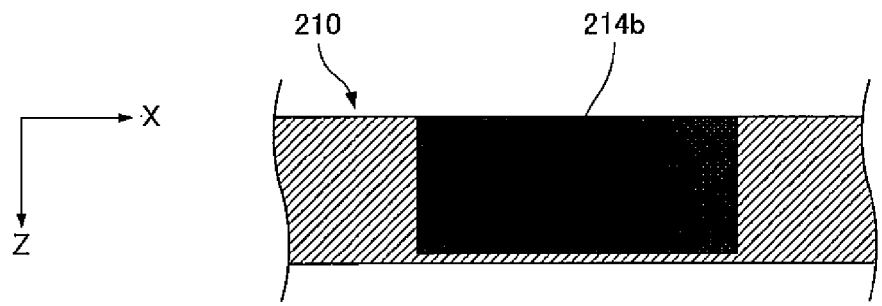

For example, the hybrid laser beam 201 is assumed to move at a speed of several tens mm/s to several hundreds mm/s. At this time, the application portion of the hybrid laser beam 201 is assumed to instantaneously melt. In this case, the hybrid laser beam 201 is moved at a higher speed than a heat transfer speed, so that the amount of heat released to the periphery of the molten pool 214 can be significantly reduced. As shown in FIG. 19A, the first high-intensity laser beam 201b and the second high-intensity laser beam 201c form outer sides 215a and 216a of a molten pool 214a. Accordingly, as shown in FIG. 19B, a molten pool 214b having a substantially rectangular or trapezoidal section is formed in the application portion of the hybrid laser beam 201.

Figure 19C:
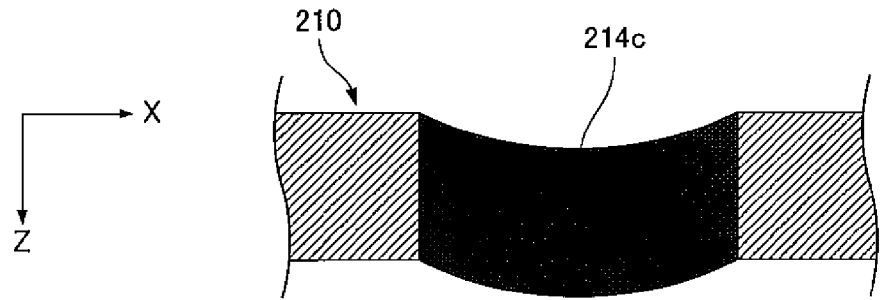

Further, the intensities of laser beams are increased to adjust the ratios of the laser beams, and further, the hybrid laser beam 201 is moved at high speed. In this case, as shown in FIG. 19C, a melting width of 2 to 3 mm can be further increased by several mm or more. A molten pool 214c with a melting portion entirely hanging down by gravity can be formed.

COMPARATIVE EXAMPLE

Figure 20:
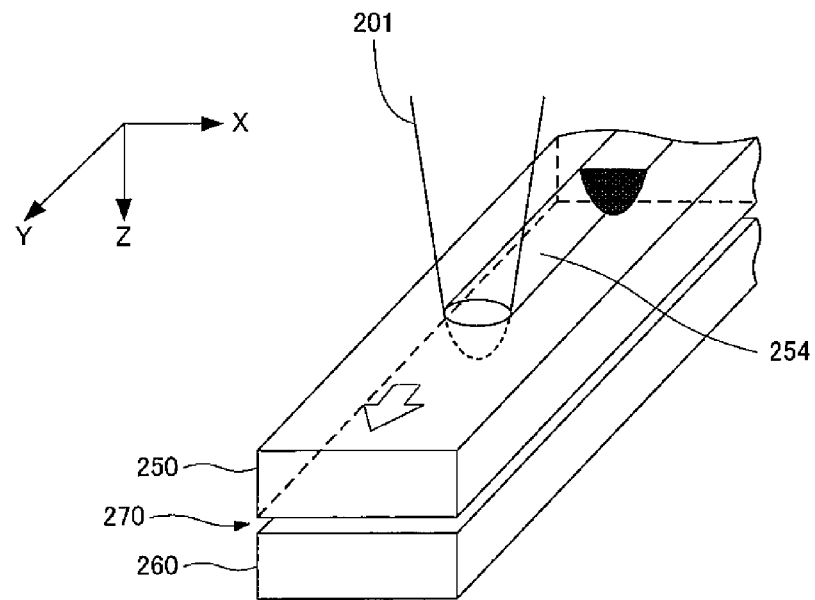
FIG. 20 shows the outline of the bead-on-plate by only a low-intensity laser beam as a comparative example of the fusion welding method in the second embodiment.
Figure 21:
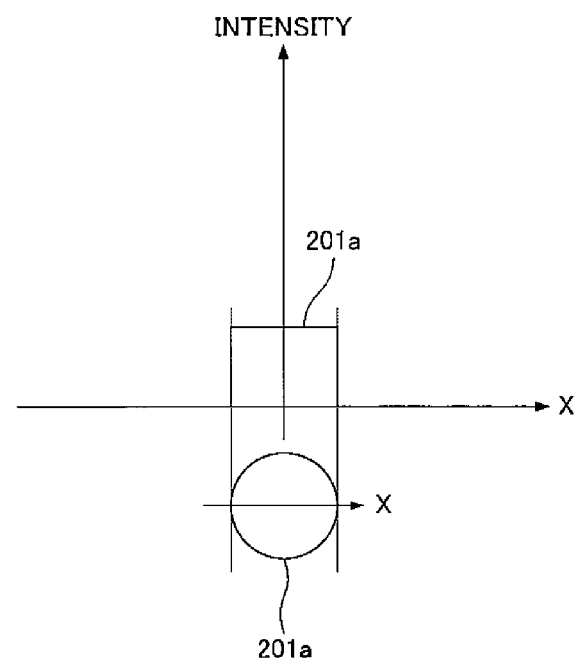
FIG. 21 shows the intensity distribution of the low-intensity laser beam used in the comparative example of the fusion welding method in the second embodiment.

As shown in FIG. 20, only the low-intensity laser beam 201a of FIG. 21 is used to lap-weld a first member 250 and a second member 260 in a bead-on-plate. At this time, the low-intensity laser beam 201a is applied to the first member 250 while being moved along the Y direction to form a molten pool 254 in the first member 250.

In this case, simply by using the low-intensity laser beam 201a, it takes time for the molten pool 254 to reach the lower surface of the first member 250 as compared with the case where the hybrid laser beam 201 is used. Thus, the low-intensity laser beam 201a cannot be moved at higher speed than the hybrid laser beam 201.

Figure 22:
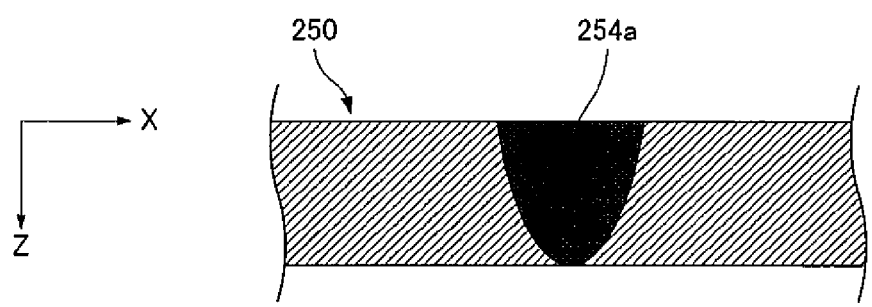
FIG. 22 shows the melting state of the bead-on-plate by only the low-intensity laser beam as the comparative example of the fusion welding method in the second embodiment.

Further, the heat of the molten pool 254 is lost to the periphery of the molten pool 254. Thus, the molten pool is tapered toward the lower surface of the first member 250. Accordingly, as shown in FIG. 22, a molten pool 254a having a conical section is formed in the application portion of the low-intensity laser beam 201a.

Even if the molten pool 254 is formed until the first member 250 is penetrated, only a small molten pool can be formed. A large thermal strain occurs on the periphery of the molten pool 254, and a large warp occurs on the periphery of the molten pool. As a result, a gap 270 between the first member 250 and the second member 260 is increased to prevent fusion welding.

Specifically, the hybrid laser beam 201 can be used to move the laser beam at higher speed as compared with the case where only the low-intensity laser beam 201a is used. Thermal conduction can reduce the amount of heat absorbed by the periphery of the molten pool. This can reduce thermal effects on the periphery of the molten pool, and increase the bottom area (welding area) of the molten pool.

<Example of Application>

In the following description, the fusion welding method according to this embodiment is used in producing a large lithium-ion battery (hereinafter referred to as an on-vehicle storage battery) to be mounted in a hybrid car or an electric vehicle.

<Lithium-Ion Battery>

Figure 23A:
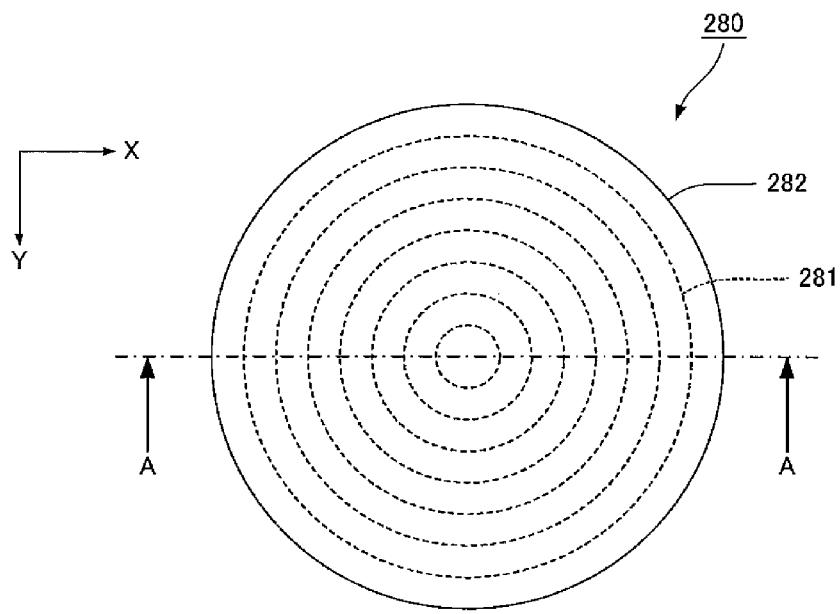
FIG. 23A is a plan view of a lithium-ion battery as a use example of the fusion welding method in the second embodiment.
Figure 23B:
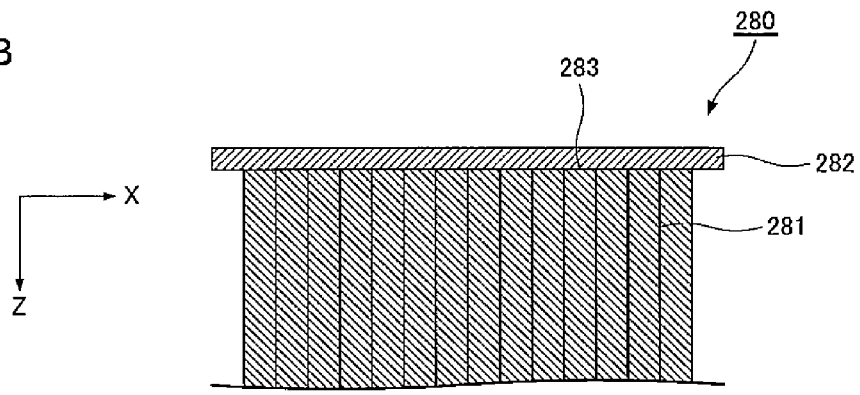
FIG. 23B is a sectional view cut along line A-A as viewed from the direction of arrow.

A lithium-ion battery generally has a laminated structure including copper foil of about 10 μm, aluminum foil of 12 to 20 μm, and an insulator held therebetween. Each electrode foil is joined perpendicularly to a current collector of the same kind of metals having a thickness of about 1 mm. Actually, as shown in FIGS. 23A and 23B, the end of spirally laminated electrode foil 281 is joined perpendicularly to a current collector 282. Further, since the electrode foil 281 is soft, a gap 283 varies in size between the electrode foil 281 and the current collector 282, or the end of the electrode foil 281 is deformed.

Figure 24:
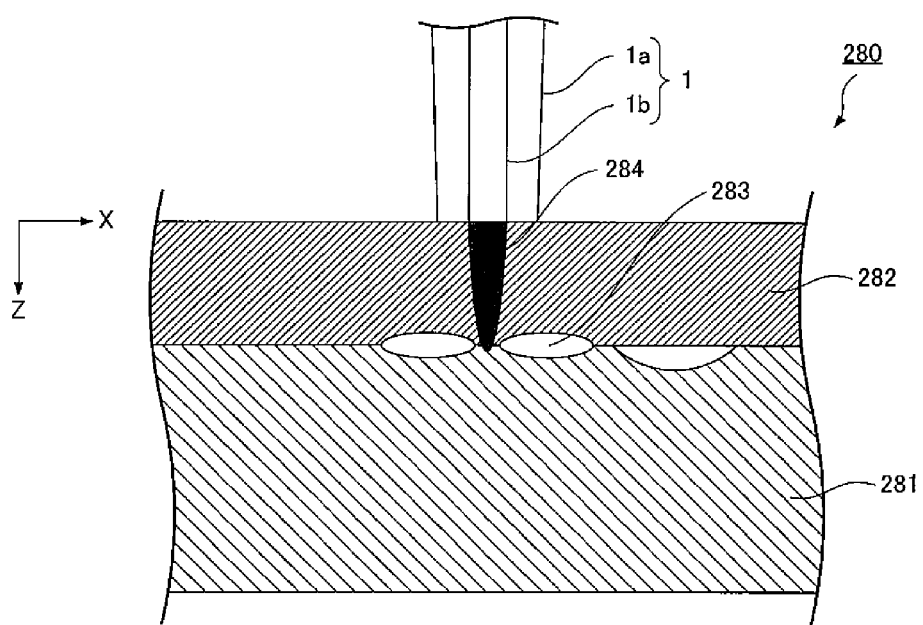
FIG. 24 shows a fusion welding result when a conventional hybrid laser processing method is used for welding the current collector and electrode foil of a lithium-ion battery as a comparative example of the fusion welding method in the second embodiment.

As shown in FIG. 24, in the conventional hybrid laser processing method, a laser beam such as a YAG laser beam or a semiconductor laser beam is used. A copper plate or an aluminum plate has low laser absorbance of about several % to 10% and very high thermal conductivity. Thus, a molten pool 284 is tapered and has a small bottom area (welding area), and thus fusion welding is performed in a minute spot. Further, a warp due to a thermal strain increases the gap 283 between the electrode foil 281 and the current collector 282.

Figure 25A:
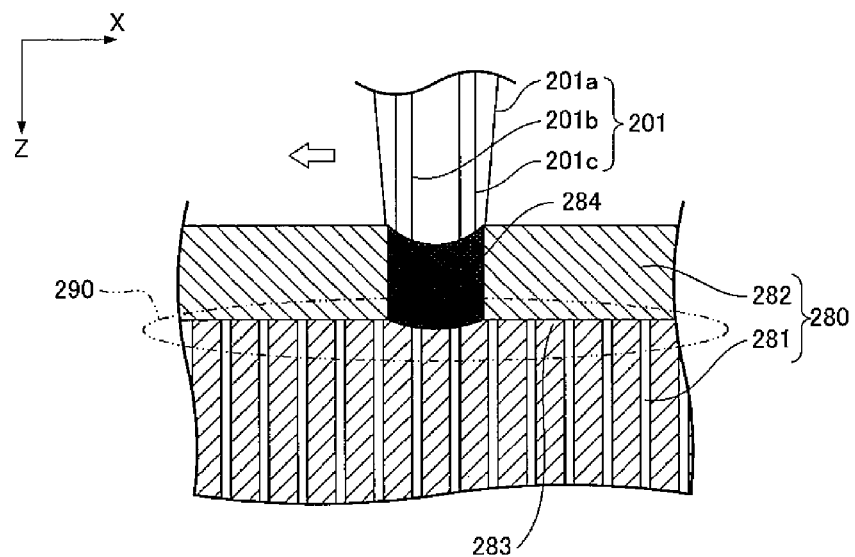
FIGS. 25A and 25B show a fusion welding result when the fusion welding method in the second embodiment is used for welding the current collector and electrode foil of a lithium-ion battery.
Figure 25B:
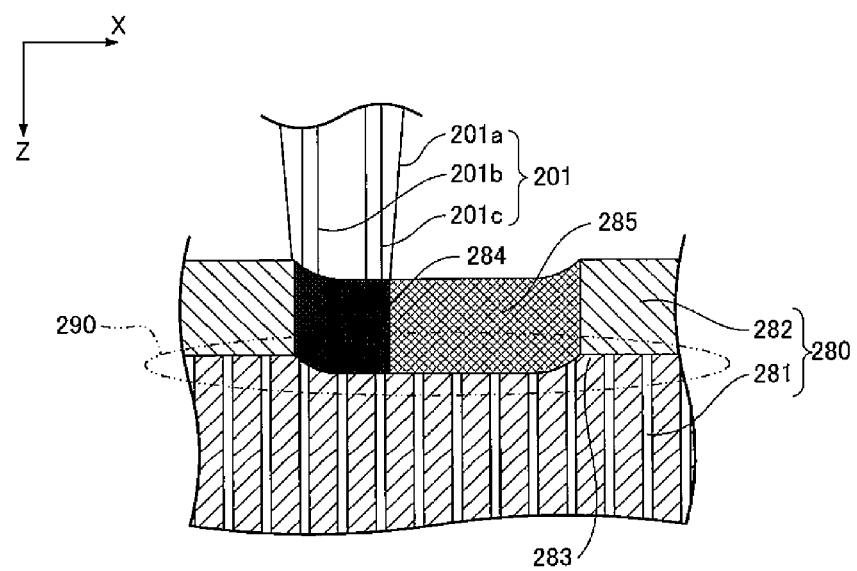

On the other hand, in the fusion welding method according to this embodiment, the first high-intensity laser beam 201b and the second high-intensity laser beam 201c instantaneously melt the current collector 282. Thus, the hybrid laser beam 201 can be moved radially or circumferentially to partially weld the electrode foil 281 and the current collector 282 as shown in FIGS. 25A and 25B.

Figure 26A:
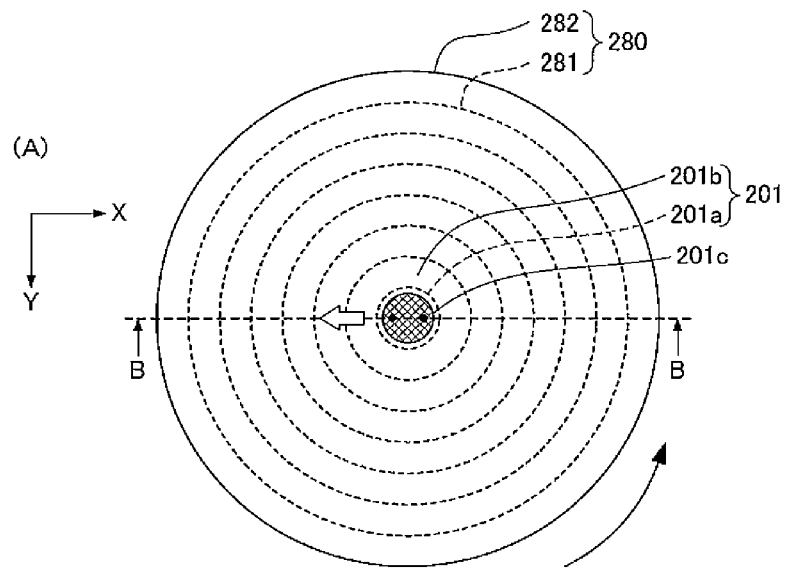
FIGS. 26A to 26C show a fusion welding process when the fusion welding method in the second embodiment is used for welding the current collector and electrode foil of the lithium-ion battery.
Figure 26B:
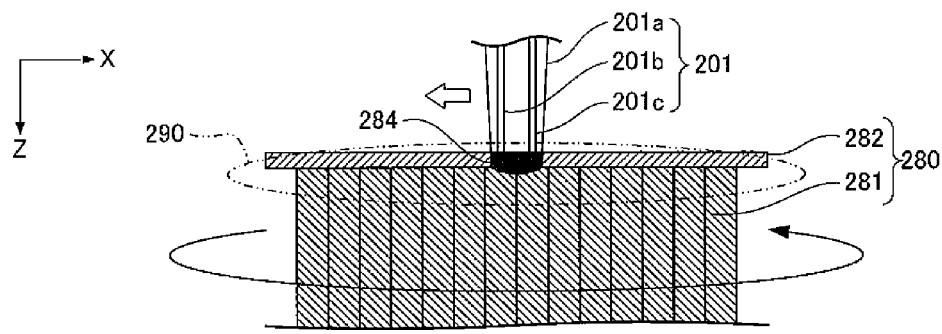
Figure 26C:
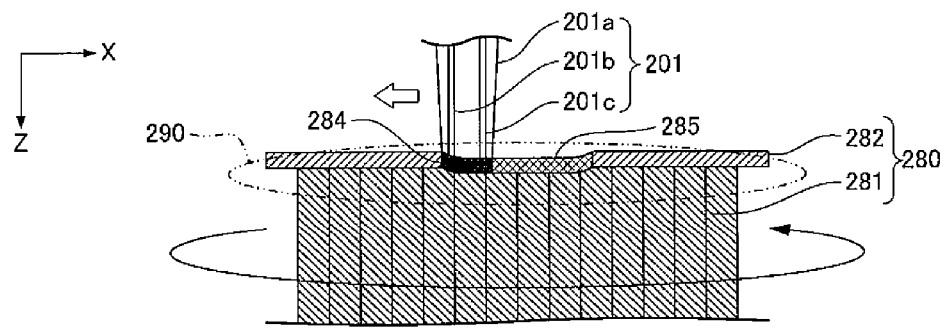

Specifically, as shown in FIGS. 26A to 26C, the hybrid laser beam 201 is applied to the center of the current collector 282. The hybrid laser beam 201 melts the center of the current collector 282 to form the molten pool 284 hanging down by gravity. The heat of the molten pool 284 melts the end of the electrode foil 281 to form fillet so as to wrap the end of the electrode foil 281. The hybrid laser beam 201 is gradually radially moved while the battery itself is rotated. This prevents spatters from entering and allows the entire end of the electrode foil 281 to be welded to the current collector 282.

FIGS. 26B and 26C show a lithium-ion battery 280 cut along line B-B to make it easy to see a part to be welded 290.

Further, in the fusion welding method according to this embodiment, the bottom area (welding area) of the molten pool can be increased. Thus, even if the gap 283 varies in size between the electrode foil 281 and the current collector 282, or the end of the electrode foil 281 is deformed, the molten pool 284 can melt the electrode foil 281 to perform fusion welding such as brazing. This allows the electrode foil 281 to be welded to the current collector 282.

The moving speed of the hybrid laser beam 201 may be reduced as the hybrid laser beam 201 moves from the center of the current collector 282 toward the outer periphery. In the fusion welding method according to this embodiment, fusion welding such as brazing is performed. Thus, in order to prevent the oxidation of the part to be welded 290, the part to be welded 290 may be filled with an inactive gas (assist gas).

The copper plate may be nickel-plated or coated with a nickel brazing filler metal beforehand, and the end of the copper foil and the copper plate may be welded. Further, the aluminum plate may be coated with an aluminum brazing filler metal, and the end of the aluminum foil and the aluminum plate may be welded.

<Summary>

As described above, according to this embodiment, the hybrid laser beam is used to fill the gap in the part to be welded in the lower portion of the molten pool formed in the first member. Thus, the first member and the second member can be welded by brazing even if there is a gap in the part to be welded between the lapped first member and second member. Further, the first member and the second member are welded in the lower portion of the molten pool formed in the first member, thereby completely preventing spatters from entering.

Further, the low-intensity laser beam gradually cools the welded part, thereby completely preventing welding defects such as cracks or porosities. Meanwhile, the first high-intensity laser beam and the second high-intensity laser beam instantaneously melt the application portion, thereby reducing thermal effects on the periphery to allow for fusion welding at high speed.

(Others)

The same advantages can be obtained if the fusion welding methods according to the first and second embodiments are used when producing a nickel hydrogen battery.

The fusion welding apparatus 150 may be used in laser scribing of a solar cell. The first high-intensity laser beam and the second high-intensity laser beam are distributed near the outer periphery of the hybrid laser beam, and thus the end of laser processing is sharply formed, which can be used for pattern delamination.

<Variant 1>

Figure 27A:
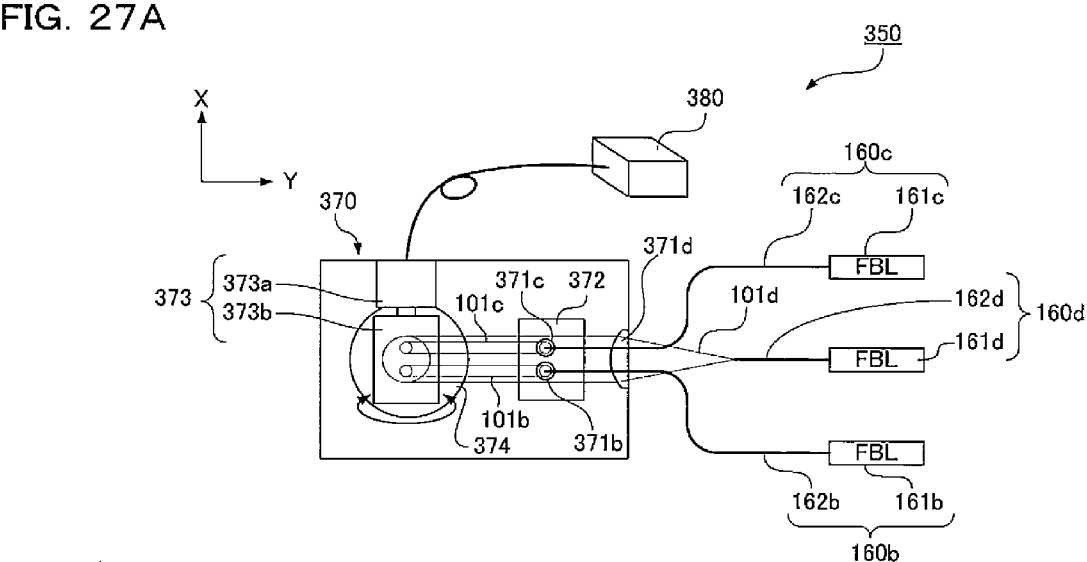
FIG. 27A is a top view of a fusion welding apparatus of Variant 1 of the first embodiment.
Figure 27B:
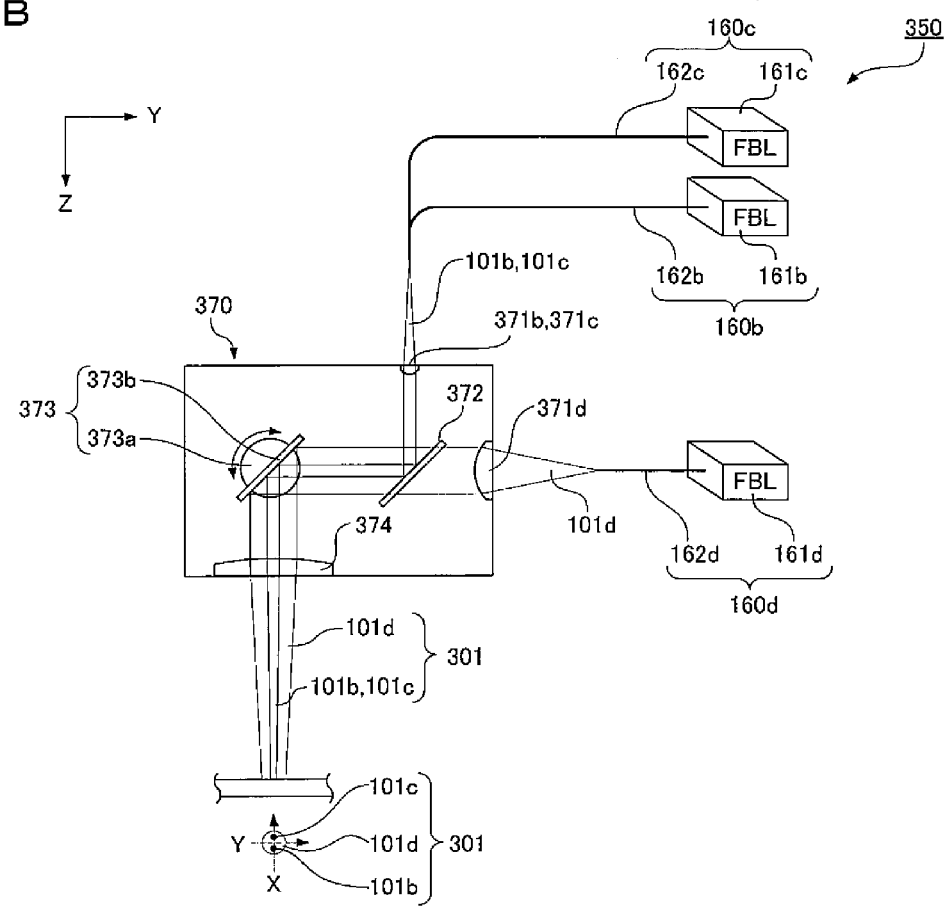
FIG. 27B is a front view thereof.

As shown in FIGS. 27A and 27B, the first high-intensity laser beam 101b and the second high-intensity laser beam 101c may be mixed on a low-intensity laser beam 101d output from a third fiber laser device 160d to generate a hybrid laser beam 301.

Specifically, a fusion welding apparatus 350 includes the third fiber laser device 160d instead of the semiconductor laser device 160a as compared with the fusion welding apparatus 150 according to the first embodiment.

The third fiber laser device 160d outputs the low-intensity laser beam 101d. The third fiber laser device 160d includes an excitation light source 161d and a third FBL optical fiber 162d. A laser beam generated by the excitation light source 161d is transmitted through the third FBL optical fiber 162d and is output from the output end of the third FBL optical fiber 162d as the low-intensity laser beam 101d.

The third FBL optical fiber 162d has a larger numerical aperture (NA) of the output end than the first FBL optical fiber 162b and the second FBL optical fiber 162c. The low-intensity laser beam 101d has a larger application area and a lower intensity peak than the first high-intensity laser beam 101b and the second high-intensity laser beam 101c.

Further, the fusion welding apparatus 350 may include an optical system 370 instead of the optical system 170 as compared with the fusion welding apparatus 150 in the first embodiment.

The optical system 370 moves a spot of the hybrid laser beam 301 while substantially maintaining the spot shape (intensity distribution) of the hybrid laser beam 301. The optical system 370 includes a first FBL collimate lens 371b, a second FBL collimate lens 371c, a third FBL collimate lens 371d, a dichroic mirror 372, a galvano-scanner 373, and a condenser lens 374.

The galvano-scanner 373 includes a servomotor 373a and a galvano-mirror 373b. The galvano-scanner 373 is controlled by a control device 380 to move the spot of the hybrid laser beam 301. The control device 380 controls the driving of the servomotor 373a. The control device 380 controls the rotation angle of the rotating shaft of the servomotor 373a.

The first FBL collimate lens 371b is placed on the extension of the output end of the first FBL optical fiber 161b when viewed from the X direction. The second FBL collimate lens 371c is placed on the extension of the output end of the second FBL optical fiber 161c. The third FBL collimate lens 371d is placed on the extension of the output end of the third FBL optical fiber 161d. The optical axis directions of the first FBL collimate lens 371b and the second FBL collimate lens 371c are adjusted in parallel with the Y direction. The optical axis direction of the third FBL collimate lens 371d is adjusted in parallel with the Z direction.

The galvano-mirror 373b is mounted on the rotating shaft of the servomotor 373a. The rotating shaft direction of the servomotor 373b is adjusted in parallel with the X direction. The galvano-mirror 373b is placed so as to overlap the optical axes of the first FBL collimate lens 371b and the second FBL collimate lens 371c. The galvano-mirror 373b is rotated about the rotating shaft of the servomotor 373a, so that the spot of the hybrid laser beam 301 is moved in the Y direction.

The dichroic mirror 372 is placed between a housing side surface, on which the first FBL collimate lens 371b and the second FBL collimate lens 371c are placed, and the galvano-mirror 373b, and on the optical axis of the third FBL collimate lens 371d. The condenser lens 374 is placed immediately below the galvano-mirror 373b. The optical axis direction of the condenser lens 374 is adjusted in parallel with the Z direction. The first high-intensity laser beam 101b, the second high-intensity laser beam 101c, and the low-intensity laser beam 101d collected in the part to be welded by the condenser lens 374 are applied to the part to be welded as the hybrid laser beam 301.

When viewed from the Z direction, the first high-intensity laser beam 101b and the second high-intensity laser beam 101c are applied in the application area of the low-intensity laser beam 101d with the optical axis of the low-intensity laser beam 101d held between the first high-intensity laser beam 101b and the second high-intensity laser beam 101c. The galvano-scanner 373 is driven to one-dimensionally scan the part to be welded with the hybrid laser beam 301 while the intensity distribution of the hybrid laser beam 301 is substantially maintained. A plurality of galvano-scanners 373 may be combined for two-dimensional scanning.

<Variant 2>

Figure 28A:
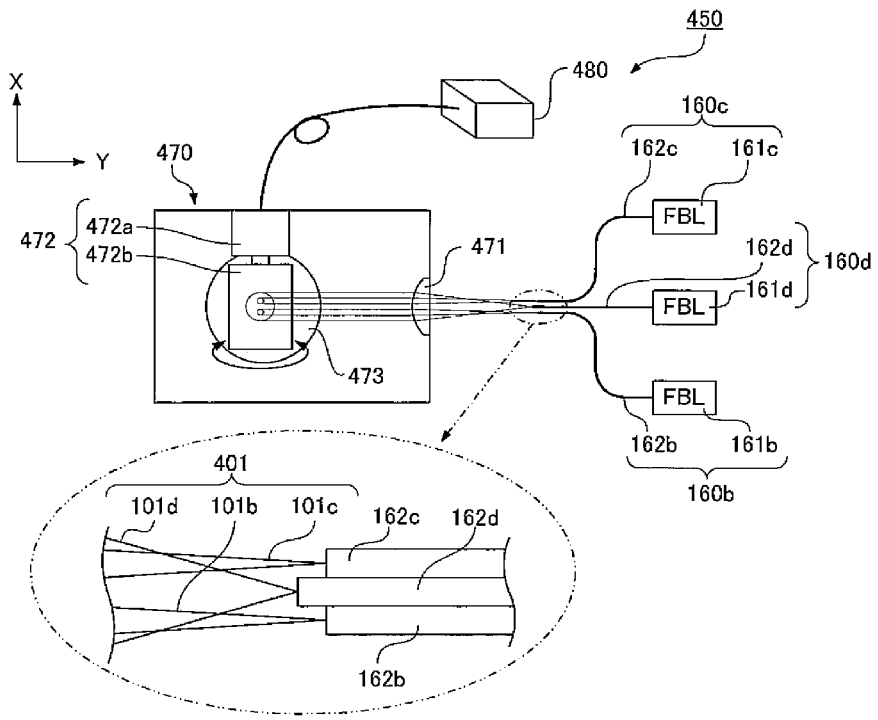
FIG. 28A is a top view of a fusion welding apparatus of Variant 2 of the first embodiment.
Figure 28B:
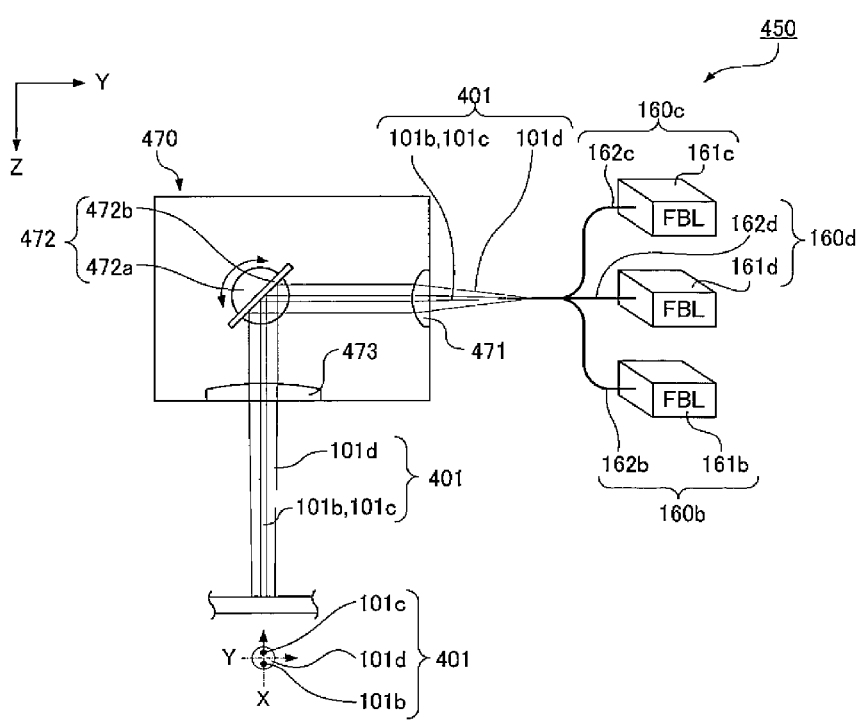
FIG. 28B is a front view thereof.
Figure 29:
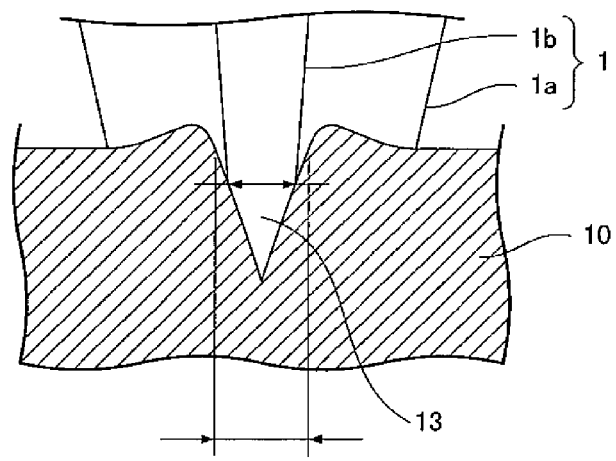
FIG. 29 shows the outline of the conventional hybrid laser processing method.

As shown in FIGS. 28A and 28B, the first high-intensity laser beam 101b and the second high-intensity laser beam 101c may be mixed on the low-intensity laser beam 101d immediately after output from the output end of the third FBL optical fiber 162d to generate a hybrid laser beam 401.

The output ends of the first FBL optical fiber 162b, the second FBL optical fiber 162c, and the third FBL optical fiber 162d are arranged and tied in parallel. The output end of the third FBL optical fiber 162d protrudes beyond the other output ends without interfering with laser beams output from the other output ends.

A fusion welding apparatus 450 includes an optical system 470 instead of the optical system 370 as compared with the fusion welding apparatus 350 in Variant 1 of the first embodiment.

The optical system 470 moves a spot of the hybrid laser beam 401 while the spot shape (intensity distribution) of the hybrid laser beam 401 is substantially maintained. The optical system 470 includes a collimate lens 471, a galvano-scanner 472, and a condenser lens 473.

The galvano-scanner 472 includes a servomotor 472a and a galvano-mirror 472b. The galvano-scanner 472 is controlled by a control device 480 to move the spot of the hybrid laser beam 401. The control device 480 controls the driving of the servomotor 472a. The control device 480 controls the rotation angle of the rotating shaft of the servomotor 472a.

The collimate lens 471 is placed on the extension of the output ends of the first FBL optical fiber 162b, the second FBL optical fiber 162c, and the third FBL optical fiber 162d when viewed from the X direction. The optical axis direction of the collimate lens 471 is adjusted in parallel with the Y direction.

The galvano-mirror 472b is mounted on the rotating shaft of the servomotor 472a. The rotating shaft direction of the servomotor 472a is adjusted in parallel with the X direction. The galvano-mirror 472b is placed in a position where the optical axis of the collimate lens 471 crosses the optical axis of the condenser lens 473. The galvano-mirror 472b is rotated about the rotating shaft of the servomotor 472a, so that the spot of the hybrid laser beam 401 is moved in the Y direction.

The condenser lens 473 is placed immediately below the galvano-mirror 472b. The optical axis direction of the condenser lens 473 is in parallel with the Z direction. The first high-intensity laser beam 101b, the second high-intensity laser beam 101c, and the low-intensity laser beam 101d collected in the part to be welded by the condenser lens 473 are applied to the part to be welded as the hybrid laser beam 401.

When viewed from the Z direction, the first high-intensity laser beam 101b and the second high-intensity laser beam 101c are applied in the application area of the low-intensity laser beam 101d with the optical axis of the low-intensity laser beam 101d held between the first high-intensity laser beam 101b and the second high-intensity laser beam 101c. The galvano-scanner 472 is controlled to one-dimensionally scan the part to be welded with the hybrid laser beam 401 while the intensity distribution of the hybrid laser beam 401 is substantially maintained. A plurality of galvano-scanners 472 may be combined for two-dimensional scanning.

What is claimed is:

1. A fusion welding method for butt-welding a first member and a second member, comprising the steps of:
    measuring a width of a gap between the first member and the second member along an extending direction of the gap; and
    generating a hybrid laser beam by mixing a low-intensity laser beam with a first high-intensity laser beam and a second high-intensity laser beam, the first high-intensity laser beam and the second high-intensity laser beam each having a smaller application area and a higher intensity peak than the low-intensity laser beam, and moving the hybrid laser beam along the gap to apply the low-intensity laser beam, the first high-intensity laser beam and the second high-intensity laser beam to the gap and a periphery of the gap, an area of the first member to which the low-intensity laser beam is applied, and an area of the second member to which the low-intensity laser beam is applied, respectively,
    in the step of moving the hybrid laser beam along the gap, the fusion welding method comprising the steps of:
    adjusting an intensity of the low-intensity laser beam to be within a range where a keyhole is not formed in the first member and the second member in the periphery of the gap, depending on a change in the width of the gap;
    forming a first keyhole in the first member in the periphery of the gap with the first high-intensity laser beam and the low-intensity laser beam to melt a portion facing the gap of the first member via the first keyhole, and forming a second keyhole in the second member in the periphery of the gap with the second high-intensity laser beam and the low-intensity laser beam to melt a portion facing the gap of the second member via the second keyhole;
    filling the gap with melt obtained by melting the portion facing the gap of the first member and melt obtained by melting the portion facing the gap of the second member, and
    cooling down a welded part between the first member and the second member with the low-intensity laser beam.

2. The fusion welding method according to claim 1, wherein in the step of moving the hybrid laser beam along the gap, if there is a change in the width of the gap, the method further comprises the step of:
    adjusting an application position of the first high-intensity laser beam so that a distance between the first keyhole and the portion facing the gap of the first member is held constant, and
    adjusting an application position of the second high-intensity laser beam so that a distance between the second keyhole and the portion facing the gap of the second member is held constant.

3. The fusion welding method according to claim 1, wherein in the step of moving the hybrid laser beam along the gap, further comprising the steps of:
    increasing the intensity of the low-intensity laser beam so as to increase an amount of the melt of each of the first member and the second member when the width of the gap increases; and
    reducing the intensity of the low-intensity laser beam so as to reduce the amount of the melt of each of the first member and the second member when the width of the gap decreases.

4. A fusion welding method for butt-welding a first member and a second member, comprising the steps of:
    measuring a width of a gap between the first member and the second member along an extending direction of the gap; and
    generating a hybrid laser beam by mixing a low-intensity laser beam with a first high-intensity laser beam and a second high-intensity laser beam, the first high-intensity laser beam and the second high-intensity laser beam each having a smaller application area and a higher intensity peak than the low-intensity laser beam, and moving the hybrid laser beam along the gap to apply the low-intensity laser beam, the first high-intensity laser beam and the second high-intensity laser beam to the gap and a periphery of the gap, an area of the first member to which the low-intensity laser beam is applied, and an area of the second member to which the low-intensity laser beam is applied, respectively,
    in the step of moving the hybrid laser beam along the gap, depending on a change in the width of the gap, the fusion welding method comprising the steps of:
    adjusting an intensity of the first high-intensity laser beam to be within a range where the first member is not penetrated;
    adjusting an intensity of the second high-intensity laser beam to be within a range where the second member is not penetrated; and melting the first member and the second member in the periphery of the gap with the hybrid laser beam, and filling the gap with melt of the first member and melt of the second member to weld the first member and the second member.

5. The fusion welding method according to claim 4, wherein in the step of moving the hybrid laser beam along the gap, the method further comprises the steps of:

increasing the intensity of the first high-intensity laser beam so as to increase an amount of the melt of the first member, and increasing the intensity of the second high-intensity laser beam so as to increase an amount of the melt of the second member, when the width of the gap increases; and reducing the intensity of the first high-intensity laser beam so as to reduce the amount of the melt of the first member, and reducing the intensity of the second high-intensity laser beam so as to reduce the amount of the melt of the second member, when the width of the gap decreases.

6. A fusion welding method for lap-welding a first member and a second member, in a case where the first member is a horizontally extending thin plate, the second member is vertically extending foil, the fusion welding method comprising the steps of:

locating the first member vertically above the second member; and, generating a hybrid laser beam obtained by mixing a low-intensity laser beam with a first high-intensity laser beam and a second high-intensity laser beam, and moving the hybrid laser beam on an upper surface of the first member, thereby melting the first member with the hybrid laser beam, and filling a gap between the first member and the second member with a lower portion of melt of the first member to weld the first member and an end of the second member, wherein the first high-intensity laser beam and the second high-intensity laser beam each have a smaller application area and a higher intensity peak than the low-intensity laser beam, the low-intensity laser beam is applied to the upper surface of the first member, the first high-intensity laser beam and the second high-intensity laser beam are applied to an outer periphery in an area to which the low-intensity laser beam is applied, an optical axis of the low-intensity laser beam is arranged between the first high-intensity laser beam and the second high-intensity laser beam, a sectional shape of the melt of the first member becomes substantially rectangular or trapezoidal when viewed from a traveling direction of the hybrid laser beam, a lower surface of the first member is brought into contact with the end of the second member.

7. A fusion welding apparatus comprising:

a low-intensity laser beam output unit for outputting a low-intensity laser beam;

a first high-intensity laser beam output unit for outputting a first high-intensity laser beam having a smaller application area and a higher intensity peak than the low-intensity laser beam;

a second high-intensity laser beam output unit for outputting a second high-intensity laser beam having a smaller application area and a higher intensity peak than the low-intensity laser beam;

an optical system for mixing the first high-intensity laser beam and the second high-intensity laser beam on the low-intensity laser beam to generate a hybrid laser beam; and a blow-off unit for blowing off an inactive gas from a front and rear in a traveling direction of the hybrid laser beam toward a portion to which the hybrid laser beam is applied, wherein an intensity of the low-intensity laser beam is set so that a keyhole is not formed in a portion to which only the low-intensity laser beam is applied, an intensity of the first high-intensity laser beam is set so that a keyhole is formed in a portion to which the first high-intensity laser beam and the low-intensity laser beam are applied together, intensity of the second high-intensity laser beam is set so that a keyhole is formed in an area to which the second high-intensity laser beam and the low-intensity laser beam are applied together, and foci of the low-intensity laser beam, the first high-intensity laser beam, and the second high-intensity laser beam are set so that the first high-intensity laser beam and the second high-intensity laser beam are distributed to an outer periphery of the low-intensity laser beam with an optical axis of the low-intensity laser beam held between the first high-intensity laser beam and the second high-intensity laser beam.

* * * * *